(12) United States Patent
Yoshida et al.

(10) Patent No.: US 10,538,821 B2
(45) Date of Patent: Jan. 21, 2020

(54) HEAT TREATMENT APPARATUS AND HEAT TREATMENT METHOD

(71) Applicant: JTEKT CORPORATION, Osaka-shi, Osaka (JP)

(72) Inventors: Wataru Yoshida, Kashiba (JP); Towako Matsui, Osaka (JP); Katsuhiko Kizawa, Osaka (JP); Takashi Sada, Kashiwara (JP); Tsuyoshi Mikami, Yamatotakada (JP)

(73) Assignee: JTEKT CORPORATION, Osaka (JP)

( * ) Notice: Subject to any disclaimer, the term of this patent is extended or adjusted under 35 U.S.C. 154(b) by 885 days.

(21) Appl. No.: 14/876,064

(22) Filed: Oct. 6, 2015

(65) Prior Publication Data

US 2016/0108486 A1 Apr. 21, 2016

(30) Foreign Application Priority Data

Oct. 17, 2014 (JP) .................. 2014-212848

(51) Int. Cl.
| | | |
|---|---|---|
| *C21D 1/667* | (2006.01) | |
| *H05B 6/10* | (2006.01) | |
| *C21D 1/42* | (2006.01) | |
| *C21D 6/00* | (2006.01) | |
| *C22C 38/44* | (2006.01) | |
| *C22C 38/04* | (2006.01) | |

(Continued)

(52) U.S. Cl.
CPC ............... *C21D 1/667* (2013.01); *C21D 1/42* (2013.01); *C21D 6/004* (2013.01); *C21D 6/005* (2013.01); *C21D 6/008* (2013.01); *C22C 38/00* (2013.01); *C22C 38/002* (2013.01); *C22C 38/02* (2013.01); *C22C 38/04* (2013.01); *C22C 38/44* (2013.01); *H05B 6/101* (2013.01); *Y02P 10/253* (2015.11)

(58) Field of Classification Search
CPC .......... C21D 1/42; C21D 1/667; C21D 6/004; C21D 6/005; C21D 6/008; H05B 6/101
See application file for complete search history.

(56) References Cited

U.S. PATENT DOCUMENTS

| | | | |
|---|---|---|---|
| 4,696,581 | A | 9/1987 | Tsushima et al. |
| 6,569,267 | B1 | 5/2003 | Nakamura et al. |
| 2005/0257860 | A1 | 11/2005 | Takayama |

(Continued)

FOREIGN PATENT DOCUMENTS

| | | |
|---|---|---|
| CN | 1699607 A | 11/2005 |
| CN | 101983247 A | 3/2011 |

(Continued)

OTHER PUBLICATIONS

Machine English Translation of JP 2011-256421 (Year: 2011).*

(Continued)

*Primary Examiner* — Veronica F Faison
(74) *Attorney, Agent, or Firm* — Oliff PLC

(57) ABSTRACT

A heat treatment apparatus that thermally treats an annular workpiece formed of a steel material by inductively heating the workpiece includes a treatment tank in which the workpiece is set and thermally treated, a holding portion that holds the workpiece at a predetermined position, an induction heating coil that surrounds the workpiece to inductively heat the workpiece, and a cooling medium that cools surfaces of the workpiece during the induction heating of the workpiece.

7 Claims, 21 Drawing Sheets

(51) Int. Cl.
*C22C 38/02* (2006.01)
*C22C 38/00* (2006.01)

(56) References Cited

U.S. PATENT DOCUMENTS

| | | | |
|---|---|---|---|
| 2007/0138169 A1* | 6/2007 | Tanaka | C21D 1/42 |
| | | | 219/652 |
| 2009/0137326 A1 | 5/2009 | Hirai et al. | |
| 2011/0017368 A1 | 1/2011 | Okamura et al. | |
| 2012/0051680 A1 | 3/2012 | Ishikawa et al. | |
| 2012/0121420 A1 | 5/2012 | Yuki et al. | |

FOREIGN PATENT DOCUMENTS

| | | | |
|---|---|---|---|
| DE | 102012204618 A | | 9/2013 |
| JP | S55-20914 A | | 2/1980 |
| JP | S61-246328 A | | 11/1986 |
| JP | S62-46018 A | | 2/1987 |
| JP | H6-179920 A | | 6/1994 |
| JP | H10-131970 A | | 5/1998 |
| JP | 2006-328465 A | | 12/2006 |
| JP | 2007-009997 A | | 1/2007 |
| JP | 2007-100121 A | | 4/2007 |
| JP | 2007-154254 A | | 6/2007 |
| JP | 2011256421 A | * | 12/2011 |
| JP | 2013-238274 A | | 11/2013 |
| JP | 2014-041789 A | | 3/2014 |

OTHER PUBLICATIONS

U.S. Appl. No. 14/876,157, filed Oct. 6, 2015 in the name of Yoshida et al.
Sep. 20, 2018 Notification of Reasons for Refusal issued in Japanese Patent Application No. 2014-212848.
May 9, 2018 Office Action issued in Chinese Patent Application No. 201510673453.5.
Sep. 12, 2016 Office Action Issued in U.S. Appl. No. 14/876,157.

* cited by examiner

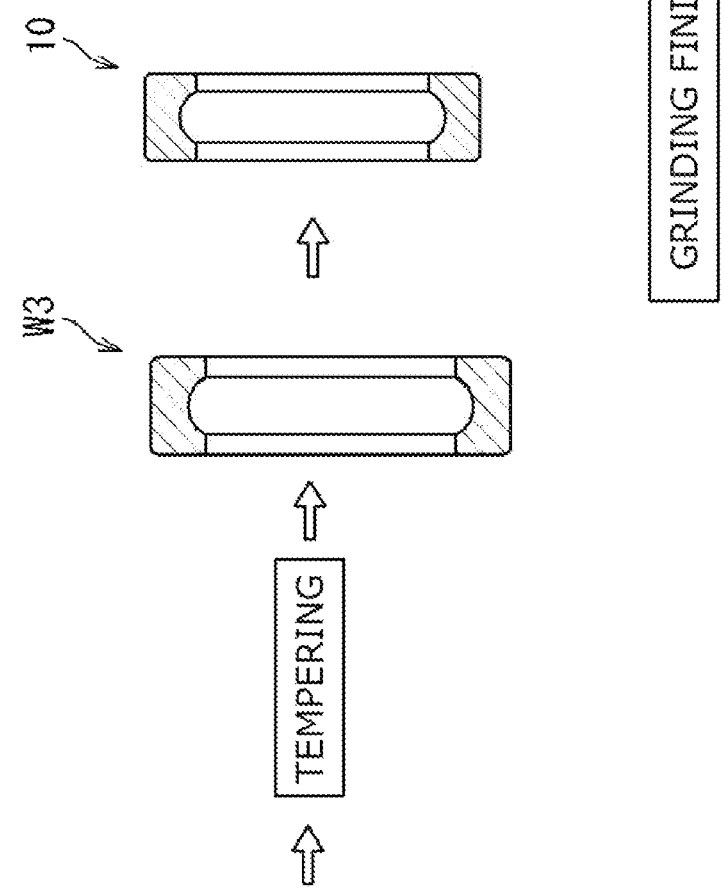

QUENCHING ⟶ TEMPERING

B−A ≧ 40°C
T ≦ 20sec

FIG.20
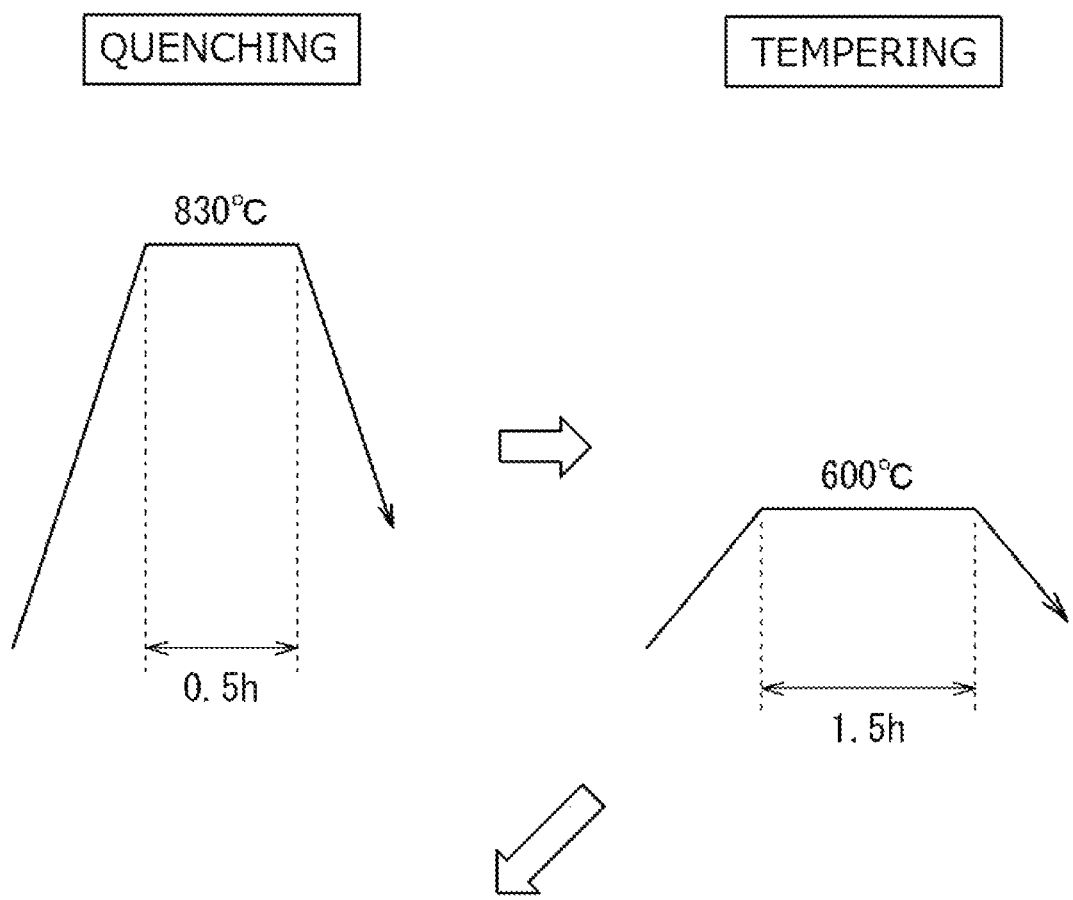
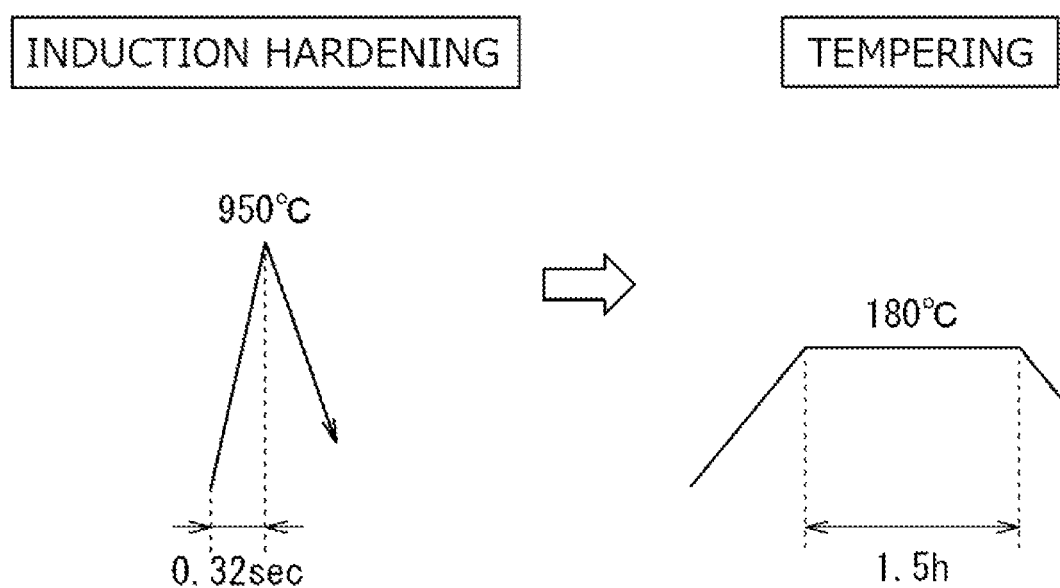

HEAT TREATMENT APPARATUS AND HEAT TREATMENT METHOD

INCORPORATION BY REFERENCE

The disclosure of Japanese Patent Application No. 2014-212848 filed on Oct. 17, 2014 including the specification, drawings and abstract, is incorporated herein by reference in its entirety.

BACKGROUND OF THE INVENTION

1. Field of the Invention

The present invention relates to a heat treatment apparatus and a heat treatment method.

2. Description of Related Art

A bearing ring forming a rolling bearing used in automobiles, industrial machines, and the like has a raceway portion that comes into relative rolling contact with rolling elements. The raceway portion is likely to be subjected to impact from the rolling elements as a result of the rolling contact therewith. Thus, in connection with manufacture of the bearing ring, various techniques have been proposed which improve mechanical properties of the bearing ring.

For example, a technique has been put to practical use in which bulk quenching (through hardening) and tempering are executed on a steel material formed of high carbon chromium bearing steel in order to increase the hardness of the bearing ring to enhance wear resistance and crushing strength of the bearing ring. However, the steel material subjected to the bulk quenching may have a high hardness and thus a high crushing strength, but the steel material as a whole from the surfaces to the inside thereof is formed mostly of the same structure of tempered martensite. Thus, the steel material contains no low hardness area and tends to be inferior in impact resistance.

To enhance the impact resistance, a technique has also been put to practical use in which carburizing and quenching and tempering are executed on a steel material of case hardened steel. However, the steel material subjected to the carburizing and quenching and the tempering has an improved impact resistance, but surfaces of the steel material have a reduced grain boundary strength due to the carburizing. Thus, the steel material tends to be inferior in crushing strength. Furthermore, secondary quenching allows the crushing strength to be enhanced, but an increase in costs resulting from an increased number of steps is unavoidable.

Japanese Patent Application Publication No. 2013-238274 (JP 2013-238274 A) states that high carbon chromium bearing steel such as SUJ2 is thermally refined, with only the surfaces thereof subjected to induction hardening, to allow the hardness of the surfaces of the steel to be set to 700 Hv or more, while allowing the internal hardness of the steel to be set to a small value of 340 to 490 Hv. As a result, this technique improves the rolling life and impact resistance of the bearing ring. However, the technique disclosed in JP 2013-238274 A fails to enclose the entire periphery of an inner layer portion of the steel material (workpiece) with a high hardness layer. As a result, the low hardness area is sandwiched between the high hardness layers, and it is difficult to sufficiently enhance the crushing strength.

As described above, the conventional technique has difficulty in providing a bearing ring that allows both high impact resistance and high crushing strength to be achieved.

SUMMARY OF THE INVENTION

An object of the present invention is to provide a heat treatment apparatus and a heat treatment method that enable provision of an annular member such as a bearing ring that allows a high impact resistance and a high crushing strength, which are in a trade-off relation, to be both achieved.

A heat treatment apparatus in an aspect of the present invention that thermally treats an annular workpiece formed of a steel material by inductively heating the workpiece includes a treatment tank in which the workpiece is set and thermally treated, a holding portion that holds the workpiece at a predetermined position, an induction heating coil that surrounds the workpiece to inductively heat the workpiece, and a cooling medium that cools surfaces of the workpiece during the induction heating of the workpiece.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 3A to 3E illustrate steps of a method for manufacturing a bearing ring, in which a heat treatment apparatus and a heat treatment method according to embodiments of the present invention can be used;

FIG. 20 is a diagram illustrating heat treatment conditions in Comparative Example 5.

DETAILED DESCRIPTION OF EMBODIMENTS

Figure 1:
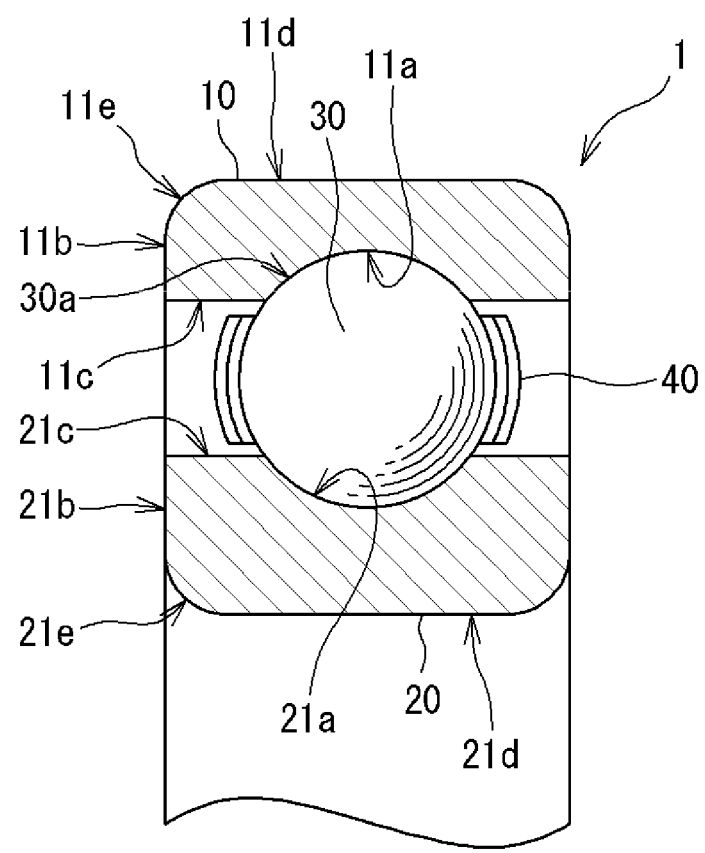
FIG. 1 is a sectional view of an important part of a ball bearing resulting from application of the present invention.

First, a rolling bearing and a bearing ring will be described which can be obtained using a heat treatment apparatus and a heat treatment method according to the present invention. Annular members that can be obtained using the heat treatment apparatus and the heat treatment method according to the present invention are not limited to the rolling bearing and the bearing ring. A ball bearing will be described below as an example of the rolling bearing. FIG. 1 is a sectional view of an important part of the ball bearing that is an example of the rolling bearing.

A ball bearing 1 depicted in FIG. 1 includes an annular outer ring 10, an annular inner ring 20, a plurality of balls 30 (rolling elements), and a cage 40. The inner ring 20 is arranged closer to an inner periphery of the outer ring 10 concentrically with the outer ring 10. The balls 30 are arranged between the outer ring 10 and the inner ring 20. The cage 40 holds the balls 30.

The outer ring 10 has an outer ring raceway portion 11a, an end surface 11b, and an outer peripheral surface 11d. The outer ring raceway portion 11a is formed on an inner peripheral surface of the outer ring 10 and serves as a rolling contact surface on which the plurality of balls 30 rolls. These surfaces are ground portions. The outer ring 10 has a chamfer 11e on an outer periphery of the outer ring 10 and a shoulder surface 11c. The chamfer 11e is contiguous with the end surface 11b and the outer peripheral surface 11d. The shoulder surface 11c is contiguous with the outer ring raceway portion 11a. These surfaces are non-ground portions. The inner ring 20 has an inner ring raceway portion 21a, an end surface 21b, and an inner peripheral surface 21d. The inner ring raceway portion 21a is formed on an outer peripheral surface of the inner ring 20 and faces the outer ring raceway portion 11a. The plurality of balls 30 rolls on the inner ring raceway portion 21a. These surfaces are ground portions. The inner ring 20 has a chamfer 21e located on an inner periphery of the inner ring 20 and a shoulder surface 21c contiguous with the inner ring raceway portion 21a. The chamfer 21e is contiguous with the end surface 21b and the inner peripheral surface 21d. These surfaces are non-ground surfaces. The balls 30 each have rolling surfaces 30a serving as rolling contact surfaces that rolling-contacts the outer ring 10 and the inner ring 20 that are mating parts of the balls 30. The outer ring 10, the inner ring 20, and the balls 30 are formed of high carbon chromium bearing steel. Examples of the high carbon chromium bearing steel include SUJ2 and SUJ3.

In the ball bearing 1, at least one of the outer ring 10 and the inner ring 20 includes a bearing ring described below. Thus, the ball bearing 1 is excellent in impact resistance and crushing strength and has an extended rolling life.

Figure 2:
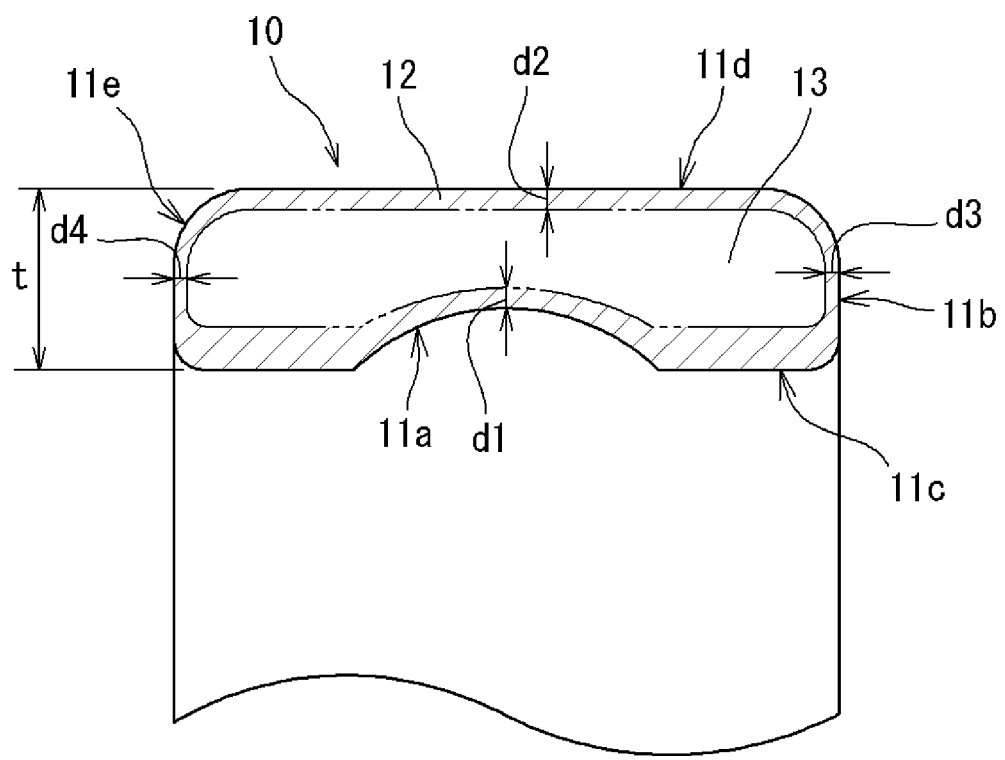
FIG. 2 is a sectional view of an important part of an outer ring of the ball bearing depicted in FIG. 1.

As an example of the bearing ring, an outer ring will be described below. FIG. 2 is a sectional view of an important part of the outer ring that is an example of the bearing ring. The bearing ring is formed of quenched and tempered high carbon chromium bearing steel. The bearing ring includes an inner layer portion and a surface layer portion. The inner layer portion is formed of martensite or sorbite and has a Vickers hardness of more than 490 HV and 710 HV or less. The surface layer portion is formed to surround an entire periphery of the inner layer portion and formed of tempered martensite, and has a higher Vickers hardness than the inner layer portion.

The "Vickers hardness" as used herein refers to a value obtained by pressing, for measurement, a Vickers indenter to a surface of the ground portion of the bearing ring (for example, the outer ring) or a section of the bearing ring cut along a radial direction.

The outer ring 10 depicted in FIG. 2 has an inner layer portion 13 and a surface layer portion 12 formed so as to enclose an entire periphery of the inner layer portion 13. The surface layer portion 12 is formed to have a relatively high hardness (Vickers hardness) compared to the inner layer portion 13. Thus, the outer ring 10 allows both high crushing strength and high impact resistance to be achieved.

The inner layer portion 13 has a tempered martensite structure or a sorbite structure. The inner layer portion 13 has a Vickers hardness of more than 490 HV and 710 HV or less. It is important for the inner layer portion 13 to have such a configuration to provide the outer ring 10 with both high crushing strength and high impact resistance. When the inner layer portion 13 has a Vickers hardness of 490 HV or less, the crushing strength is insufficient. On the other hand, when the inner layer portion 13 has a Vickers hardness of more than 710 HV, it is difficult to enhance the crushing strength and the impact resistance. The Vickers hardness of the inner layer portion 13 is preferably 500 HV or more and 700 HV or less.

The Vickers hardness of the inner layer portion 13 is preferably 490 HV or more and 620 HV or less and more preferably 500 HV or more and 610 HV or less when the bearing ring (outer ring 10) is used for applications that particularly need impact resistance.

The Vickers hardness of the inner layer portion 13 is preferably 620 HV or more and 710 HV or less and more preferably 630 HV or more and 700 HV or less when the bearing ring (outer ring 10) is used for applications that particularly need a high crushing strength.

The surface layer portion 12 is formed to enclose the entire periphery of the inner layer portion 13 and has a tempered martensite structure. The Vickers hardness of the surface layer portion 12 may be higher than the Vickers hardness of the inner layer portion 13 and may gradually decrease from an outermost surface of the surface layer portion 12 toward the inner layer portion 13. The Vickers hardness of the surface layer portion 12 is not particularly limited as long as the Vickers hardness of the surface layer portion 12 is higher than the Vickers hardness of the inner layer portion 13. However, the outer ring raceway portion 11a, a part of the surface layer portion 12, preferably has a Vickers hardness of 740 HV or more and less than 800 HV at the outermost surface. A Vickers hardness of less than 740 HV may shorten the rolling life of the outer ring 10 (bearing ring), whereas a Vickers hardness of more than 800 HV may reduce the impact resistance.

The outer ring raceway portion 11a preferably has an area extending from the outermost surface toward the inner layer portion 13 and having a Vickers hardness of 700 HV or more (hereinafter also referred to as a high hardness surface layer (a shaded portion in FIG. 2)). A depth d1 of the high hardness surface layer of the outer ring raceway portion 11a preferably satisfies Inequality (1) below with respect to a maximum shearing stress depth Z0.

$$3Z0 \leq d1 \leq 8Z0 \tag{1}$$

When the depth d1 in the outer ring raceway portion 11a is less than three times as large as the maximum shearing stress depth Z0, the fatigue strength of the surface is low. As a result, the outer ring 10 may have a shortened rolling life. On the other hand, when the depth d1 in the outer ring raceway portion 11a is at least eight times as large as the maximum shearing stress depth Z0, the ratio at which the outer ring 10 is occupied by the inner layer portion 13 is low, possibly making toughness of the outer ring 10 insufficient. When the bearing ring is used, the maximum shearing stress depth Z0 is approximately 0.1 to 0.2 mm though the maximum shearing stress depth Z0 varies according to a rated load.

An area of the surface layer portion 12 extending from the outermost surface of the outer ring raceway portion 11a to the maximum shearing stress depth Z0 preferably has a compressive residual stress of 50 MPa or more. When the compressive residual stress is less than 50 MPa, the rolling life may fail to be secured.

A part (outer ring non-raceway portion) of the surface layer portion 12 that is different from the outer ring raceway portion 11a preferably has a higher Vickers hardness than the inner layer portion 13 such that the Vickers hardness is 700 HV or more and less than 800 HV at the outermost surface. When the Vickers hardness of the outer ring non-raceway portion is less than 700 HV at the outermost surface, the crushing strength may be low. On the other hand, when the Vickers hardness of the outer ring non-raceway portion is more than 800 HV at the outermost surface, the impact resistance may be low. The part of the surface layer portion 12 that is different from the outer ring raceway portion 11a preferably has a Vickers hardness of 720 HV or more at the outermost surface.

The part of the surface layer portion 12 that is different from the outer ring raceway portion 11a (outer ring non-raceway portion) preferably also has an area extending from the outermost surface toward the inner layer portion 13 and having a Vickers hardness of 700 HV or more (high hardness surface layer). In the outer ring non-raceway portion of the outer ring 10, the ratios of a depth d2 of the high hardness surface layer at the outer peripheral surface 11d and depths d3 and d4 of the high hardness surface layer at the end surface 11b to a maximum thickness t of the outer ring 10 (d2/t, d3/t, and d4/t) preferably satisfy Inequality (2).

$$0.05 < (d2/t, d3/t, \text{ and } d4/t) \leq 0.45 \quad (2)$$

When the ratios of the depths d2 to d4 of the high hardness surface layers to the maximum thickness t are 0.05 or less, the crushing strength may be insufficient. On the other hand, the ratios of the depths d2 to d4 of the high hardness surface layers to the maximum thickness t are more than 0.45, the high hardness surface layer occupies a larger part of the surface layer portion 12, leading to an insufficient impact resistance.

The outer ring 10 is manufactured using quenched and tempered high carbon chromium bearing steel. Examples of the high carbon chromium bearing steel include SUJ2 and SUJ3. However, the present invention is not limited to these examples. The quenching and the tempering will be described below. Of course, the bearing ring of the present invention is not limited to the outer ring but may be the inner ring.

Figures 4A, 4B:
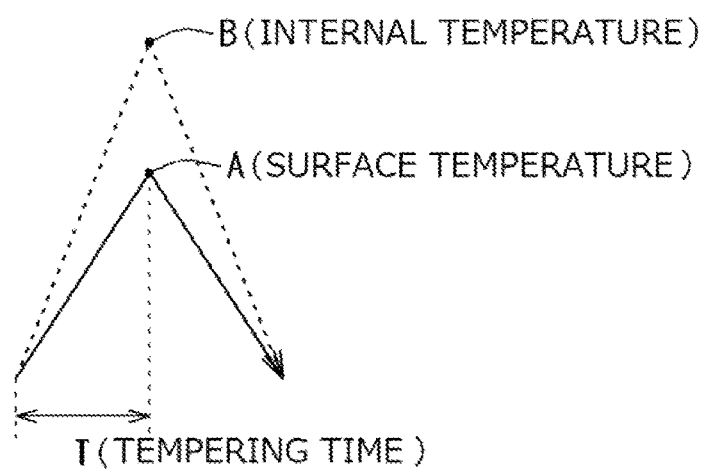
FIGS. 4A and 4B illustrate a heat treatment process in the manufacturing method illustrated in FIGS. 3A to 3E.

Now, a method for manufacturing the bearing ring will be described taking, as an example, a method for manufacturing the outer ring 10. In the method for manufacturing the bearing ring, the heat treatment method of the present invention can be adopted for a quenching process and a tempering process. FIGS. 3A to 3E illustrate steps of the method for manufacturing a bearing ring according to the embodiment of the present invention. FIGS. 4A and 4B illustrate a heat treatment process (the heat treatment method according to an embodiment of the present invention) in the method for manufacturing the outer ring 10 illustrated in FIGS. 3A to 3E.

First, an annular material W1 (see FIG. 3A) formed from the high carbon chromium bearing steel is manufactured. The annular material W1 is machined into a predetermined shape to obtain a workpiece W2 of the outer ring 10 having portions corresponding to the outer ring raceway portion 11a, the end surface 11b, the shoulder surface 11c, and the outer peripheral surface 11d ("pre-machining step", see FIG. 3B].

Then, quenching (see FIG. 3C) and tempering (see FIG. 3D) are performed on the resultant workpiece W2. Methods for the quenching and the tempering are not particularly limited, and the heat treatment method according to the embodiment of the present invention may be used to achieve the quenching and the tempering. The heat treatment method according to the embodiment of the present invention is a heat treatment method of thermally treating a workpiece of high carbon chromium bearing steel. The heat treatment method includes a step (A) of quenching the workpiece W2 and a step (B) of tempering the quenched workpiece W2. In the step (B), the quenched workpiece W2 is inductively heated such that a tempering time is 20 seconds or less and a surface temperature is at least 40° C. lower than an internal temperature. The step (A) and the step (B) will be described in this order.

In the step (A), the workpiece W2 obtained is quenched ("a quenching process", see FIG. 3C and FIG. 4A). In the quenching, the workpiece W2 is wholly uniformly heated and rapidly cooled such that both the inner layer portion 13 and the surface layer portion 12 become martensite and such that an incompletely quenched structure (fine pearlite) is 5% or less. When the incompletely quenched structure is more than 5%, the manufactured outer ring 10 has an insufficient hardness and thus has a shortened rolling life. A method for the quenching is not particularly limited and may be induction hardening, through hardening, or the like.

The quenching may be performed under conditions that the workpiece W2 is heated at a quenching temperature of 810 to 850° C. for 0.5 to two hours and then rapidly cooled. The quenching temperature is preferably set to 820° C. or higher in order to achieve a sufficient quenching property and to 840° C. or lower in order to prevent the grain size from increasing. A heating time is preferably set to 0.5 hours or longer in order to uniformly heat the members and to 1.5 hours or shorter in order to prevent the grain size from increasing. The rapid cooling is performed by, for example, oil cooling in an oil bath of cooling oil. An oil bath temperature for the cooling oil is typically 60 to 180° C.

Then, the step (B) is executed.

In the step (B), the quenched workpiece W2 is tempered to obtain an workpiece W3 ["a tempering process", see FIG. 3D and FIG. 4B]. The tempering is performed, as shown in FIG. 4B, by heating the workpiece W2 with the tempering temperature of the outermost surface of the quenched workpiece W2 (see a "surface temperature A" in FIG. 4B) adjusted to be lower than the tempering temperature inside the workpiece W2 (see an "internal temperature B" in FIG. 4B) (that is, the internal temperature B−the surface temperature A≥40° C.). When the tempering is thus performed with the surface temperature A at least 40° C. lower than the internal temperature B, the hardness inside the workpiece W2 may be set to be suitable for achieving a sufficient impact resistance. In addition, when the tempering is performed under the above-described conditions, then during the tempering, a decrease in the amount of retained austenite is suppressed, and a compressive stress can be increased. Therefore, when a bearing ring resulting from the present process steps is used as an outer ring and/or an inner ring for a rolling bearing or the like, the life of the bearing (attributed to surface-originating peel-off) can be increased, and a high static-load capacity can be secured. Furthermore, the heat treatment method including the steps (A) and (B) can provide annular members having an impact resistance comparable to that achieved by carburizing and a high crushing strength, with a small number of steps and low energy consumption.

A tempering time for the tempering is 20 seconds or shorter (see "tempering time T" in FIG. 4B). This allows a sufficient compressive residual stress to be applied to the workpiece W2. The "tempering time" as used herein refers to a time from the start of heating until a predetermined tempering temperature (surface temperature and internal temperature) is reached. Such tempering may be performed using, for example, a heat treatment apparatus described below. Cooling for the tempering may be, for example, cooling with air or leaving the workpiece W2 to cool.

In the tempering process, the difference between the surface temperature and the internal temperature (internal temperature−surface temperature) is preferably 600° C. or less. When the difference is more than 600° C., the workpiece W2 may be cracked. The tempering time T is preferably set to two seconds or longer and more preferably three seconds or longer in order to suppress possible temperature unevenness to stabilize the quality of the annular member. On the other hand, the tempering time is preferably set to 18 seconds or shorter in order to allow a sufficient compressive residual stress to be applied to the workpiece W2.

Specific preferable temperatures for the tempering are such that the surface temperature is adjusted to 260 to 290° C. and the internal temperature is adjusted to 320 to 715° C. The surface temperature is preferably set to 275° C. or lower in order to achieve an appropriate rolling life. The internal temperature is preferably set to 365° C. or higher and more preferably 450° C. or higher in order to secure an appropriate impact resistance. The internal temperature is preferably set to 575° C. or lower in order to secure an appropriate crushing strength. When the internal temperature is between 450 and 575° C., an extended rolling fatigue life and a high impact resistance can be achieved, and this range of temperatures is more suitable for providing a high crushing strength. The surface temperature and the internal temperature can be measured using a type K thermocouple.

In the tempering process, a variation in temperature over the entire surface of the workpiece W2 is preferably adjusted to 20° C. or less in order to stabilize the quality. A technique for suppressing a variation in the surface temperature may involve, in the tempering using the heat treatment apparatus described below, rotating the workpiece W2 or stirring a cooling medium to make the temperature of the cooling medium uniform, during induction heating.

Frequency and output power during induction heating are set as needed to achieve the above-described temperature ranges according to the thickness and mass of the workpiece W2 and the cooling power of a coolant. The frequency is preferably 300 to 600 Hz. A frequency of more than 600 Hz may increase the surface temperature to reduce the difference between the surface temperature and the internal temperature. The output power is typically approximately 1 to 300 kW and preferably five to 100 kW.

Then, grinding finish is performed on portions of the tempered workpiece W3 corresponding to the outer ring raceway portion 11a, the end surface 11b, and the outer peripheral surface 11d ("grinding finish", FIG. 3E). The outer ring 10 (bearing ring) can be produced through the above-described steps.

Now, the heat treatment apparatus according to the embodiment of the present invention will be described. The heat treatment apparatus according to the embodiment of the present invention is suitable for executing the above-described heat treatment method according to the embodiment of the present invention. The heat treatment apparatus can be suitably used not only for the tempering process in the method for manufacturing a bearing ring but also for various heating processes of heating a ring-like workpiece such that the surface temperature of the workpiece is lower than the internal temperature of the workpiece. A specific configuration of the heat treatment apparatus will be described with reference to two embodiments as examples.

Figure 5:
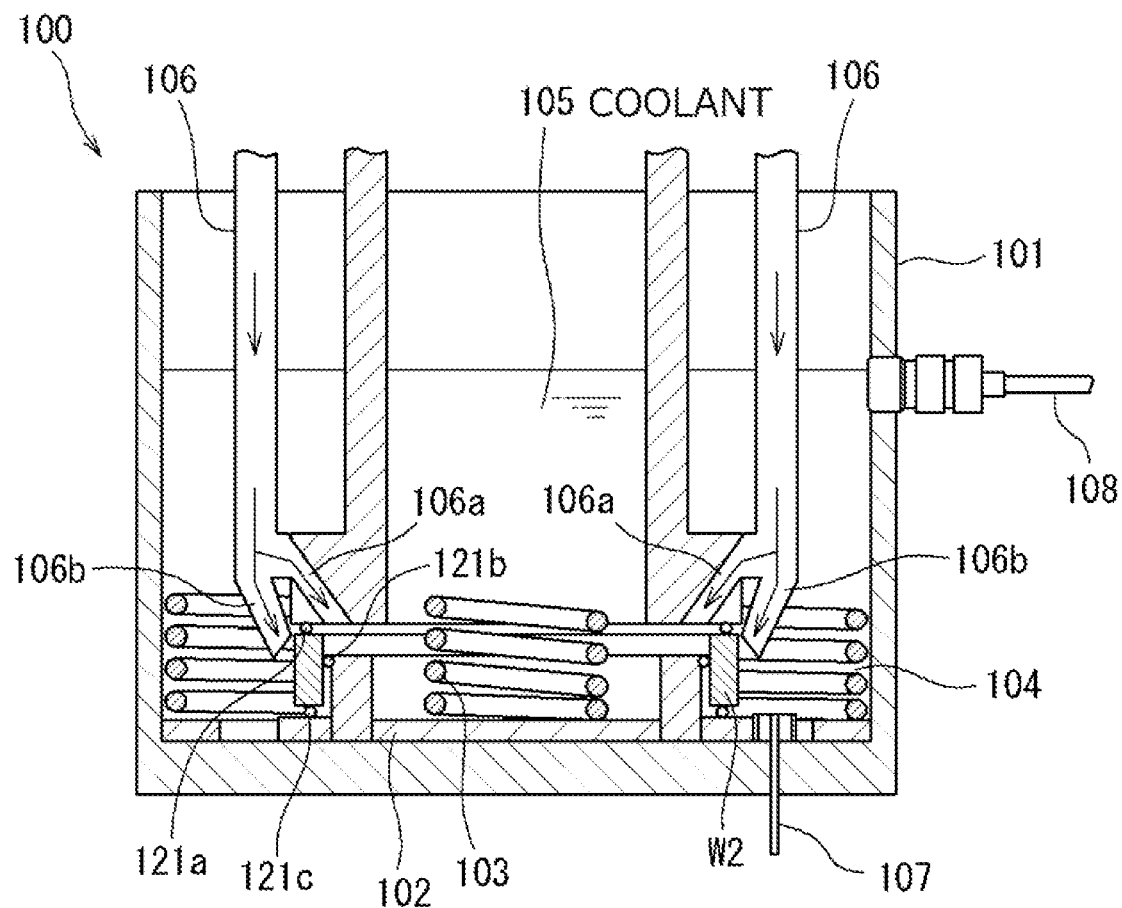
FIG. 5 is a schematic diagram illustrating an example of a tempering apparatus according to an embodiment of the present embodiment.

A heat treatment apparatus according to a first embodiment will be described below. FIG. 5 is a sectional view of an important part of an example of the heat treatment apparatus according to the embodiment of the present invention. An annular workpiece W2 is set inside a heat treatment apparatus 100 depicted in FIG. 5. The heat treatment apparatus 100 includes a treatment tank 101, a holding portion 102, a first induction heating coil 103, a second induction heating coil 104, a coolant 105, injection portions 106, and a power transmission portion 107. In the treatment tank 101, heat treatment is executed on the workpiece W2. The holding portion 102 holds the workpiece W2 such that the workpiece W2 is rotatable around an axis thereof while suppressing movement of the workpiece W2 in an upward direction and the horizontal direction. The first induction heating coil 103 inductively heats the workpiece W2 from an inner periphery of the workpiece W2. The second induction heating coil 104 surrounds the workpiece W2 to inductively heat the workpiece W2 from an outer periphery of the workpiece W2. The coolant 105 is a cooling medium stored in the treatment tank 101 to cool the surfaces of the workpiece W2. The injection portions 106 allow the coolant 105 to be injected onto the workpiece W2 to cool the surfaces of the workpiece W2. The power transmission portion 107 transmits, to the holding portion 102, power that allows the workpiece W2 held by the holding portion 102 to rotate around the axis of the workpiece W2. The use of the heat treatment apparatus 100 according to the embodiment of the present invention allows the workpiece W2 to be inductively heated with the surfaces of the workpiece W2 forcibly cooled. Consequently, during the induction heating, the internal temperature of the workpiece W2 can be made higher than the surface temperature of the workpiece W2. Thus, when the heat treatment apparatus 100 is used, for example, for a tempering process for the quenched workpiece W2, the inner layer portion can have a lower hardness than the surface layer portion. As a result, an annular member with a high impact resistance and a high crushing strength can be provided with reduced manhours and reduced energy consumption.

The treatment tank 101 is a bottomed cylindrical container that can store the coolant 105. The container forming the treatment tank 101 is formed of electrically insulating ceramics or an electrically insulating synthetic resin. Consequently, the heat treatment apparatus 100 has the container formed of electrically insulating ceramics or an electrically insulating synthetic resin, as the treatment tank 101. Thus, the heat treatment apparatus 100 itself can be restrained from being heated. The size of the container may be set as needed according to the application of the heat treatment apparatus 100, the size of the workpiece W2, and the like.

The coolant 105 is stored in the treatment tank 101. The treatment tank 101 is provided with a discharge port 108 through which an excess portion of the coolant 105 is discharged to the exterior of the treatment tank 101. The workpiece W2 is set inside the treatment tank 101 so as to be immersed in the coolant 105 stored in the treatment tank 101. Such a configuration allows heating of the workpiece W2 immersed in the coolant 105 stored in the treatment tank 101. Thus, the workpiece W2 can be heated with the surfaces of the workpiece W2 efficiently cooled, ensuring reliable maintenance of the difference between the surface temperature and the internal temperature of the workpiece W2 during heating.

The holding portion 102 has first support portions 121c, third support portions 121a, and second support portions 121b. The first support portions 121c receive a lower surface of the workpiece W2 in a point contact manner. The third support portions 121a suppress upward movement of the workpiece W2. The second support portions 121b suppress horizontal movement of the workpiece W2. Consequently, the holding portion 102 suppresses the upward movement and horizontal movement of the workpiece W2 while holding the workpiece W2 in a point contact manner. At this time, the support portions 121a may contact the workpiece W2 or a gap of up to approximately one mm may be formed between each of the support portions 121a and the workpiece W2. The support portions 121b may contact the workpiece W2 or a gap of up to approximately 0.5 mm may be formed between each of the support portions 121b and the workpiece W2. Formation of such a gap allows avoidance of a situation where the surfaces of the workpiece W2 are pressed by the support portions 121a and 121b even when the workpiece W2 is thermally expanded.

The support portions 121a to 121c are all spheres. Thus, in contacting the workpiece W2, the support portions 121a to 121c are in point contact with the workpiece W2. This suppresses heat transfer from the workpiece W2 to each of the support portions 121a to 121c. Consequently, the workpiece W2 can be prevented from having a nonuniform temperature. Moreover, cooling of the workpiece W2 by the coolant 105 is less likely to be impeded by the support portions 121a to 121c. As a result, the workpiece W2 can be prevented from being overheated as a result of insufficient cooling. The numbers of the support portions 121a to 121c may each be three or more in a circumferential direction in a plan view, and is typically three to six. Preferably, three support portions are provided at regular intervals.

In the heat treatment apparatus 100, the holding portion 102 is formed of electrically insulating ceramics or an electrically insulating synthetic resin. Thus, the holding portion 102 itself can be restrained from being heated and a variation in the surface temperature of the workpiece W2 can be suppressed.

The first and second induction heating coils 103 and 104 are installed inside the treatment tank 101. The first induction heating coil 103 is spiral and has an outside diameter smaller than an inside diameter of the workpiece W2. The workpiece W2 is set around an outer periphery of the first induction heating coil 103. On the other hand, the second induction heating coil 104 is spiral and has an inside diameter larger than an outside diameter of the workpiece W2. The workpiece W2 is set inside an inner periphery of the second induction heating coil 104. The first and second induction heating coils 103 and 104 are supplied with a high frequency current. Consequently, the workpiece W2 can be inductively heated from both the inner periphery and the outer periphery of the workpiece W2 up to a desired temperature.

The coolant 105 may be any liquid that enables the surfaces of the workpiece W2 to be cooled. The coolant 105 is not particularly limited. Examples of the coolant 105 include water, oil, and a water-soluble polymer. An example of the oil may be quenching oil. An example of the water-soluble polymer may be polyalkylene glycol (PAG). The water-soluble polymer may be used as a water solution of the polymer. In this case, the compounding amount of the water-soluble polymer in water may be set as needed according to the type of the polymer and the like. Preferably, the coolant 105 has a high heat conductivity in order to efficiently cool the surfaces of the workpiece W2 and is easy to handle.

A plurality of injection portions 106 is provided at predetermined intervals along a circumferential direction of the workpiece W2. Each of the injection portions 106 has an injection port 106a and an injection port 106b. The injection port 106a allows the coolant 105 to be injected toward an inner peripheral surface of the workpiece W2. The injection port 106b allows the coolant 105 to be injected toward an outer peripheral surface of the workpiece W2. The coolant 105 is injected through the injection ports 106a and 106b to allow the surfaces of the workpiece W2 to be uniformly cooled. The injection ports 106a and 106b are disposed at positions where the injection ports 106a and 106b are immersed in the stored coolant 105. Disposing the injection ports 106a and 106b at these positions allows entrainment of air bubbles to be prevented when the coolant 105 is supplied. Channels for the injection portions 106 are each provided with a flow control valve and a pressure regulating valve (neither of which depicted in the drawings). Thus, supply conditions for the coolant can be adjusted.

In the heat treatment apparatus, the coolant 105 injected from the injection portions 106 is stored in the treatment tank 101. The excess portion of the coolant 105 is discharged to the exterior of the treatment tank 101 through the discharge port 108. A channel (not depicted in the drawings) through which the discharged coolant 105 is resupplied via the injection portions 106 may be provided as needed.

The power transmission portion 107 is coupled to the holding portion 102 so as to be able to transmit power to the holding portion 102. Thus, the holding portion 102 can rotate around an axis of the holding portion 102 based on power transmitted from the power transmission portion 107. The rotation of the holding portion 102 allows the workpiece W2 held by the holding portion 102 to be rotated around the axis of the workpiece W2. Therefore, the heat treatment apparatus 100 allows the workpiece W2 to be inductively heated uniformly. Although not depicted in the drawings, the heat treatment apparatus 100 includes needed members such as a power supply needed for induction heating, a matching device, and a temperature regulating member for controlling the temperature of the coolant.

Figure 6A:
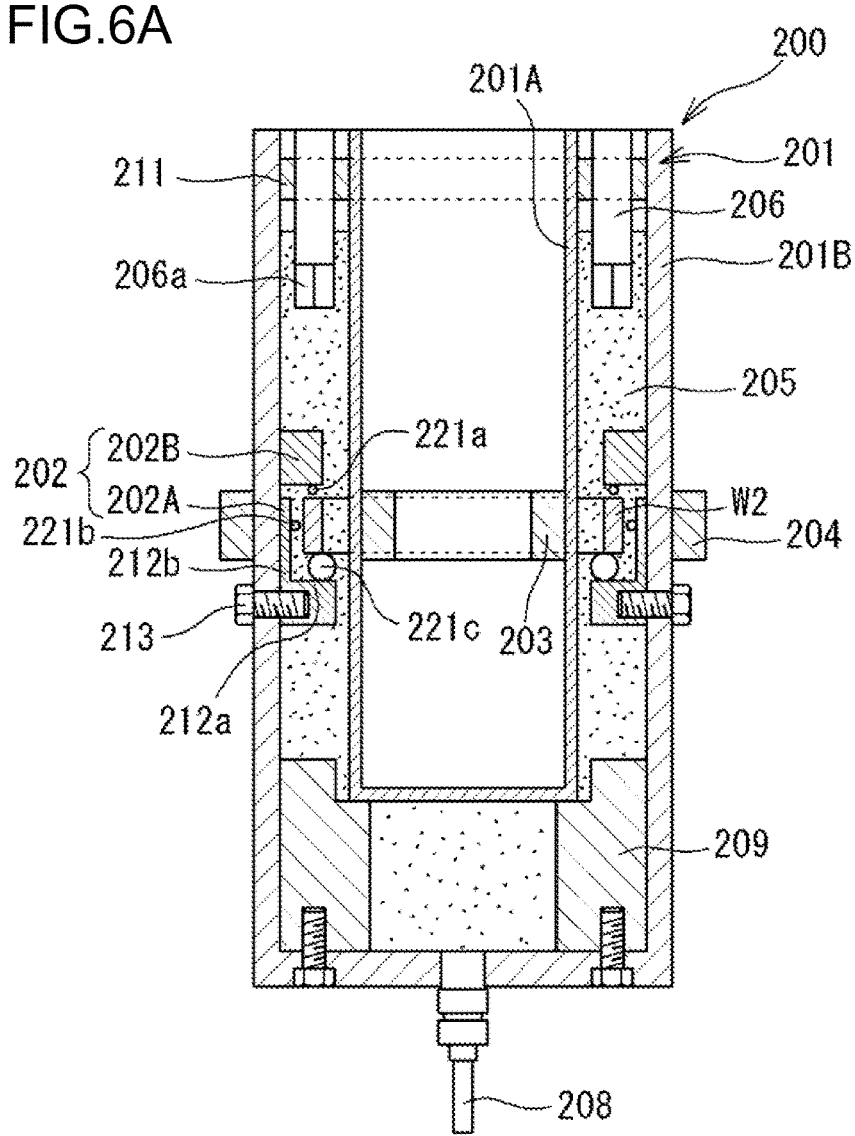
FIG. 6A is a longitudinal sectional view illustrating another example of the tempering apparatus according to an embodiment of the present embodiment.
Figure 6B:
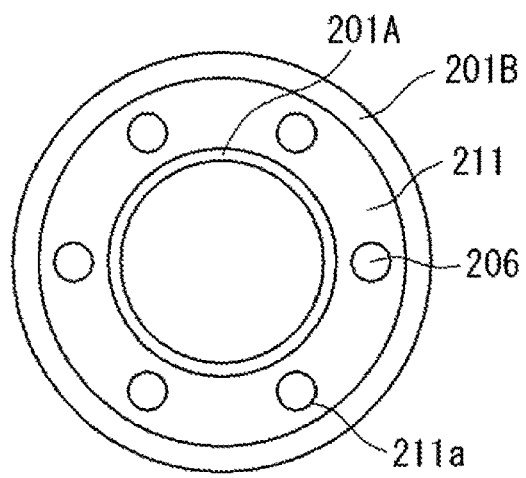
FIG. 6B is a plan view illustrating this example of the tempering apparatus.

A heat treatment apparatus according to a second embodiment will be described below. FIG. 6A is a sectional view of an important part of another example of a heat treatment apparatus according to the embodiment of the present invention. FIG. 6B is a plan view of the another example of the heat treatment apparatus. An annular workpiece W2 is set inside a heat treatment apparatus 200 depicted in FIGS. 6A and 6B. The heat treatment apparatus 200 includes a fixation jig 202, a first induction heating coil 203, a second induction heating coil 204, a coolant 205, and an injection portion 206. The workpiece W2 is thermally treated in the treatment tank 201. The fixation jig 202 is a holding portion that holds the workpiece W2 in the treatment tank 201. The first induction heating coil 203 inductively heats the workpiece W2 from the inner periphery of the workpiece W2. The second induction heating coil 204 surrounds the workpiece W2 to inductively heat the workpiece W2 from the outer periphery of the workpiece W2. The coolant 205 is a cooling medium stored in the treatment tank 201 to cool the surfaces of the workpiece W2. The injection portion 206 injects the coolant 205 onto the workpiece W2.

The treatment tank 201 is a bottomed ring-like container that can store the coolant 205, and includes a cylindrical inner case 201A and a cylindrical outer case 201B. At a bottom portion of the outer case 201B, a plurality of support members 209 is installed at predetermined intervals along a circumferential direction of the outer case 201B to support the inner case 201A in the outer case 201B so that a bottom portion of the inner case 201A is separated from the bottom portion of the outer case 201B. The inner case 201A and the outer case 201B forming the treatment tank 201 are formed of electrically insulating ceramics or an electrically insulating synthetic resin. As described above, the heat treatment apparatus 200 has the container formed of electrically insulating ceramics or an electrically insulating synthetic resin, as the treatment tank 201. Thus, the heat treatment apparatus 200 itself can be restrained from being heated. The size of the container may be set as needed according to the application of the heat treatment apparatus 200, the size of the workpiece W2, and the like. The liquid coolant 205 is stored in the treatment tank 201. The treatment tank 201 is provided with the discharge port 208 which is located at the bottom portion of the treatment tank 201 and through which an excess portion of the coolant 205 is discharged to the exterior of the treatment tank 201. The workpiece W2 is set inside the treatment tank 201 so as to be immersed in the coolant 205 stored in the treatment tank 201.

The heat treatment apparatus 200 includes the fixation jig 202 as a holding portion that holds the workpiece W2 in the treatment tank 201. The fixation jig 202 includes a lower fixation jig 202A and upper fixation jigs 202B. The lower fixation jig 202A holds the workpiece W2 at a predetermined height. The upper fixation jigs 202B suppress upward movement of the workpiece W2. The lower fixation jig 202A includes a ring-like bottom portion 212a that allows the workpiece W2 to be held and a wall portion 212b provided around an outer periphery of the bottom portion 212a. The lower fixation jig 202A is fixed to the outer case 201B via a bolt 213. The bottom portion 212a is provided with support portions (first support portions) 221c that receive the lower surface of the workpiece W2 in a point contact manner. On an inner peripheral surface of the wall portion 212b, support portions (second support portions) 221b are provided which suppresses horizontal movement of the workpiece W2. The workpiece W2 and the support portions 221b may contact one another or a gap of up to approximately 0.5 mm may be formed between the workpiece W2 and each of the support portions 221b. The reason for this is as described above. Therefore, the lower fixation jig 202A suppresses the horizontal movement of the workpiece W2 while holding the workpiece W2 in a point contact manner.

The support portions 221b and 221c are all spheres. Thus, in contacting the workpiece W2, the support portions 221b and 221c are in point contact with the workpiece W2. This suppresses heat transfer from the workpiece W2 to each of the support portions 221b and 221c, allowing the workpiece W2 to be prevented from having a nonuniform temperature. Consequently, cooling of the workpiece W2 with the coolant 205 is less likely to be impeded by the support portions 221b and 221c. As a result, the workpiece W2 can be prevented from being overheated as a result of insufficient cooling. The numbers of the support portions 221b and 221c may each be three or more in a circumferential direction in a plan view, and is typically three to six. Preferably, three support portions are provided at regular intervals.

On the other hand, the upper fixation jigs 202B are a plurality of pillared members arranged at predetermined intervals. On lower surfaces of the upper fixation jigs 202B, support portions (third support portions) 221a are provided which suppress upward movement of the workpiece W2. The workpiece W2 and the support portions 221a may contact one another or a gap of up to approximately 1 mm may be formed between the workpiece W2 and each of the support portion 221a. The reason for this is as described above. Therefore, the upper fixation jigs 202B suppress the upward movement of the workpiece W2. The upper fixation jigs 202B are a plurality of pillared members arranged away from one another. Gaps are present between the pillared members, and thus even when the coolant 205 is injected from above, a flow of the coolant 205 is less likely to be impeded. As a result, stir of the coolant 205 is less likely to be impeded. The support portions 221a are also spheres. Thus, the support portions 221a contact the workpiece in a point contact manner to produce effects similar to the effects resulting from the support portions 221b and 221c being spheres. The number of the support portions 221a may be three or more in a circumferential direction in a plan view, and is typically three to six. Preferably, three support portions are provided at regular intervals. The upper fixation jigs 202B are integrated with a cover portion 211 described below so as to lie at a predetermined height.

The lower fixation jig 202A and the upper fixation jigs 202B (including the support portions 221a to 221c) are formed of electrically insulating ceramics or an electrically insulating synthetic resin. In the heat treatment apparatus 200, the fixation jig 202 is formed of electrically insulating ceramics or an electrically insulating synthetic resin. Thus, the fixation jig 202 itself can be restrained from being heated and a variation in the surface temperature of the workpiece W2 can be suppressed.

The first induction heating coil 203 is installed inside the inner case 201A, and the second induction heating coil 204 is installed outside the outer case 201B. The first induction heating coil 203 is spiral and has an outside diameter smaller than an inside diameter of the inner case 201A. On the other hand, the second induction heating coil 204 is spiral and has an inside diameter larger than an outside diameter of the outer case 201B. The first and second induction heating coils 203 and 204 are supplied with a high frequency current to allow the workpiece W2 to be inductively heated from both the inner periphery and the outer periphery of the workpiece W2 up to a desired temperature. The first and second induction heating coils 203 and 204 may be installed in the treatment tank 201.

In an upper portion of treatment tank 201, injection portions 206 through which the coolant 205 is injected into the treatment tank 201 are attached at a plurality of positions at regular intervals along the circumferential direction. Each of the injection portions 206 has an injection nozzle 206a which is located at a tip of the injection portion 206 and through which the coolant 205 is injected. In the heat treatment apparatus 200, the coolant 205 is injected into the treatment tank 201 (between the inner peripheral surface of the outer case 201B and the outer peripheral surface of the inner case 201A) through the injection nozzles 206a to allow the surfaces of the workpiece W2 to be cooled. Furthermore, the coolant 205 is injected through the injection nozzles 206a to allow the temperature of the stored coolant 205 to be made generally uniform. This is because, since the coolant 205 is stored between the outer case 201B and the inner case 201A, only a small total amount of the coolant is stored in the treatment tank 201, allowing the liquid coolant 205 stored in the treatment tank 201 to be reliably stirred by the flow of the coolant 205 injected through the injection nozzles 206a. Thus, the heat treatment apparatus 200 allows the surfaces of the workpiece W2 to be uniformly cooled without the need to rotate the workpiece W2. Furthermore, each of the injection portions 206 is provided with a flow control valve and a pressure regulating valve (neither of which depicted in the figures). This allows a condition for the supply of the coolant to be adjusted. The condition for the supply of the coolant 205 through the injection nozzles 206a in order to allow the stored coolant 205 to be uniformly stirred is that the amount of coolant injected is approximately 8 to 80 litters/min, though this may depend on the volume of the treatment tank 201.

The injection portions 206 are attached such that the injection nozzles 206a lie at positions below an upper surface of the stored coolant 205 (such that the injection nozzles 206a are immersed in the coolant 205). The injection portions 206 attached at such positions allow the coolant 205 stored in the treatment tank 201 to be more uniformly stirred in conjunction with the injection of the coolant 205 through the injection nozzles 206a. Furthermore, entrainment of air currents in the coolant can be prevented when the coolant is supplied.

In the upper portion of the treatment tank 201, the cover portion 211 is disposed which is shaped like a ring and in which through-holes 211a are formed at positions corresponding to the attachment positions of the injection portions 206. Providing of the cover portion 211 allows the coolant 205 to be prevented from spilling out from the treatment tank 201 through the upper portion thereof when the coolant 205 is stirred. The cover portion 211, the injection portions 206, and the upper fixation jigs 202B may be integrated together. In this case, operations such as setting of the workpiece and removal of the workpiece after treatment are facilitated.

In the heat treatment apparatus 200, the coolant 205 injected through the injection portions 206 is stored in the treatment tank 201, and an excess portion of the coolant 205 is discharged to the exterior of the treatment tank 201 through the discharge port 208. A channel (not depicted in the drawings) through which the discharged coolant 205 is resupplied via the injection portions 206 may be provided as needed. In the heat treatment apparatus 200, the coolant 205 may be similar to the coolant 105 used in the treatment tank 101 according to the first embodiment. Although not depicted in the drawings, the heat treatment apparatus 200 includes needed members such as a power supply needed for induction heating, a matching device, and a temperature regulating member for controlling the temperature of the coolant.

The heat treatment apparatus 200 according to the second embodiment differs from the heat treatment apparatus 100 according to the first embodiment in that the workpiece W2 is not rotated when thermally treated. Thus, the heat treatment apparatus 200 need not include a mechanism allowing the workpiece W2 to be rotated, and thus has a simplified overall configuration. The heat treatment apparatus 200, like the heat treatment apparatus 100, enables the surfaces of the workpiece W2 to be uniformly cooled A heat treatment apparatus according to another embodiment will be described below. In the heat treatment apparatuses 100 and 200 according to the first and second embodiments, the induction heating coils 103 and 203 are installed inside the workpiece W2 (in the heat treatment apparatus 200, further inside the inner case 201A). However, in the heat treatment apparatus according to the present invention, a center core formed of silicon steel (not depicted in the drawings) may be provided instead of the induction heating coils 103 and 203. In this case, the entire surfaces of the workpiece W2 can be heated as is the case with the use of the coil 103 or 203, producing effects similar to those exerted when the coil 103 or 203 is used.

Figure 7:
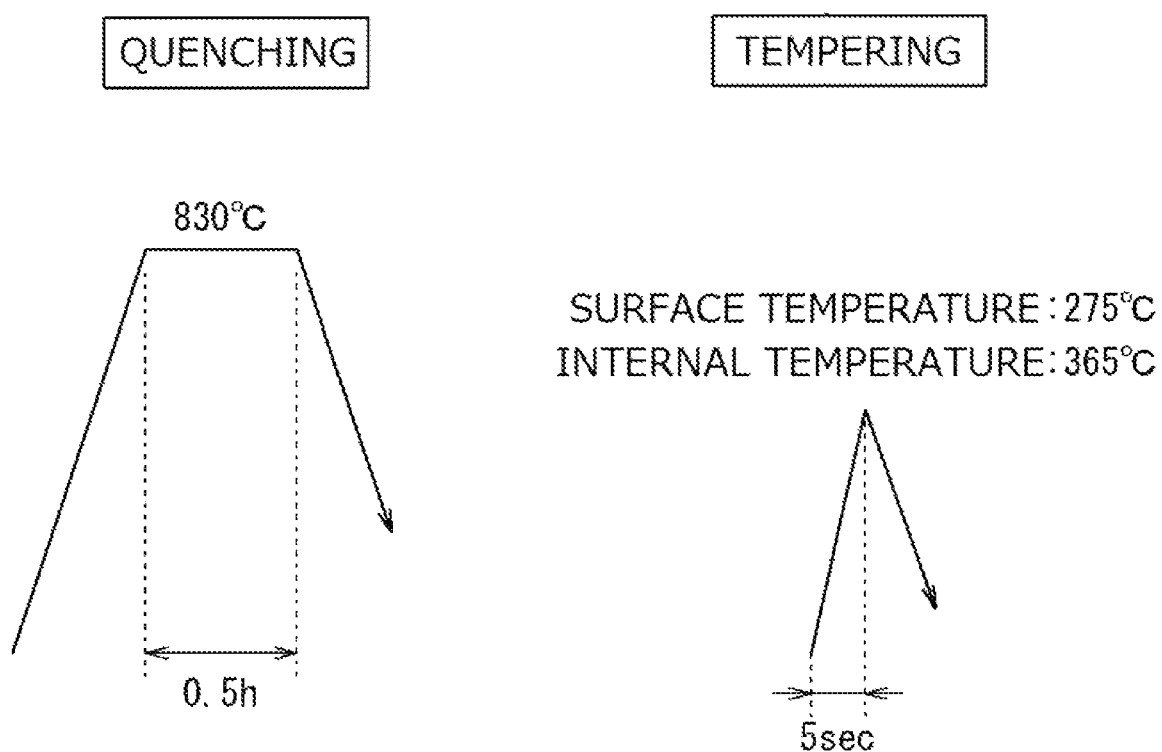
FIG. 7 is a diagram illustrating heat treatment conditions in Example 1.

Now, the effects of the heat treatment apparatus and heat treatment method of the present invention are verified with reference to examples and the like. Example 1 will be described below. An annular material was manufactured from a steel material formed of SUJ2, and the resultant annular material was cut into a predetermined shape. Thus, a workpiece for an outer ring was obtained (outside diameter: 62 mm, thickness: 3 mm). The resultant workpiece was quenched and tempered under heat treatment conditions in Table 1 and FIG. 7. Grinding finish was performed on the treated workpiece to obtain a specimen for an outer ring for a bearing (bearing number: 6206). The quenching was performed using a controlled atmosphere heat treatment furnace, and the tempering was performed using the heat treatment apparatus 200 depicted in FIG. 6. FIG. 7 is a diagram indicating heat treatment conditions in Example 1. In Example 1, the workpiece was heated at 830° C. for 0.5 hours for bulk quenching and then cooled in oil down to 80° C. Then, the workpiece was set in the heat treatment apparatus 200 and tempered by being inductively heated at a frequency of 480 Hz and an output power of 47 kW for five seconds so as to have a surface temperature of 275° C. and an internal temperature of 365° C., with the surfaces of the workpiece simultaneously cooled.

Figure 8:
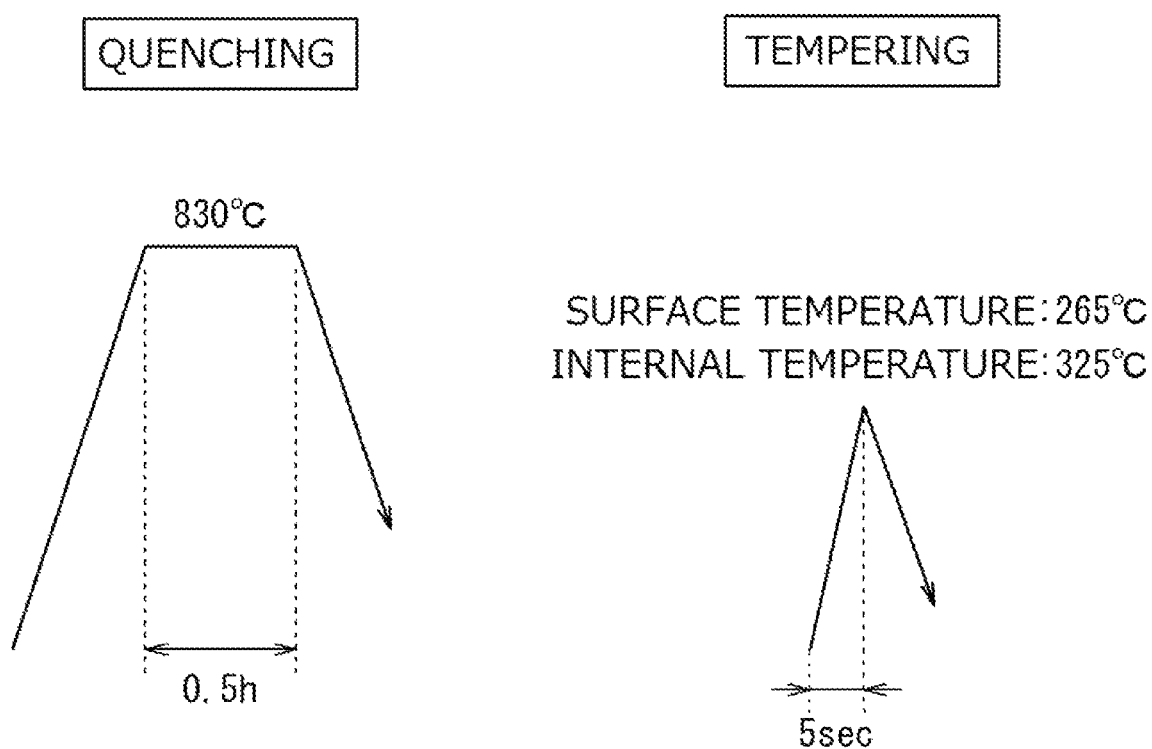
FIG. 8 is a diagram illustrating heat treatment conditions in Example 2.
Figure 9:
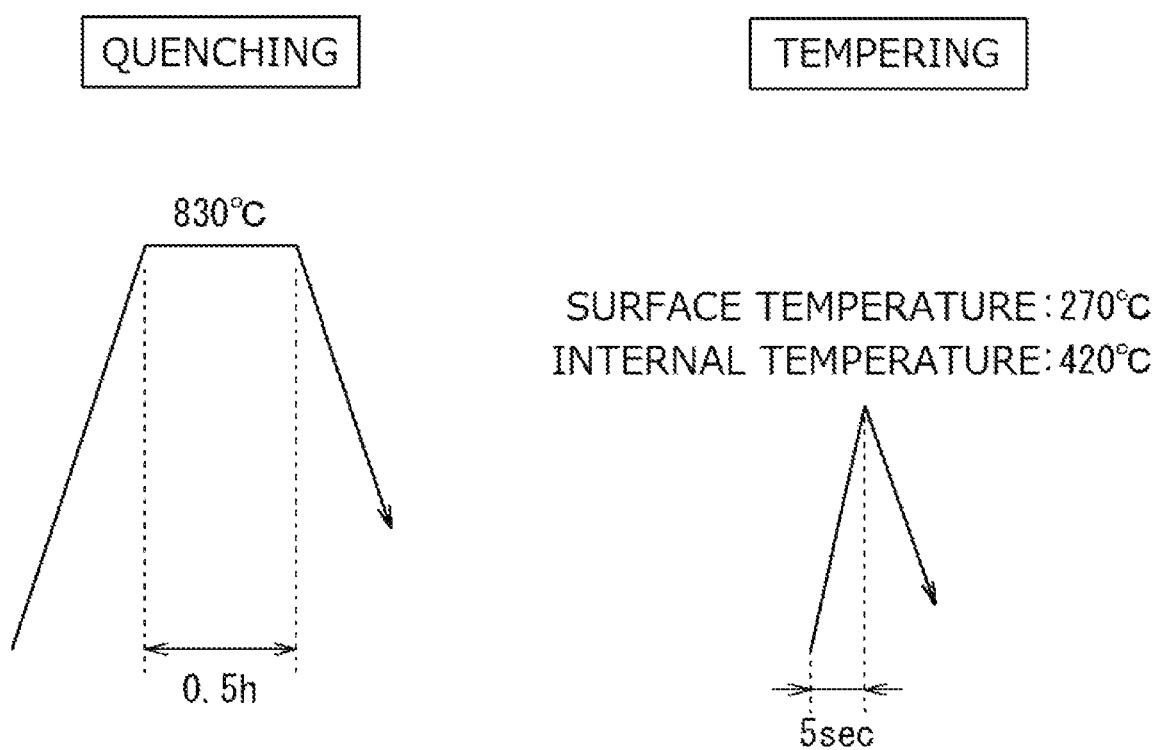
FIG. 9 is a diagram illustrating heat treatment conditions in Example 3.
Figure 10:
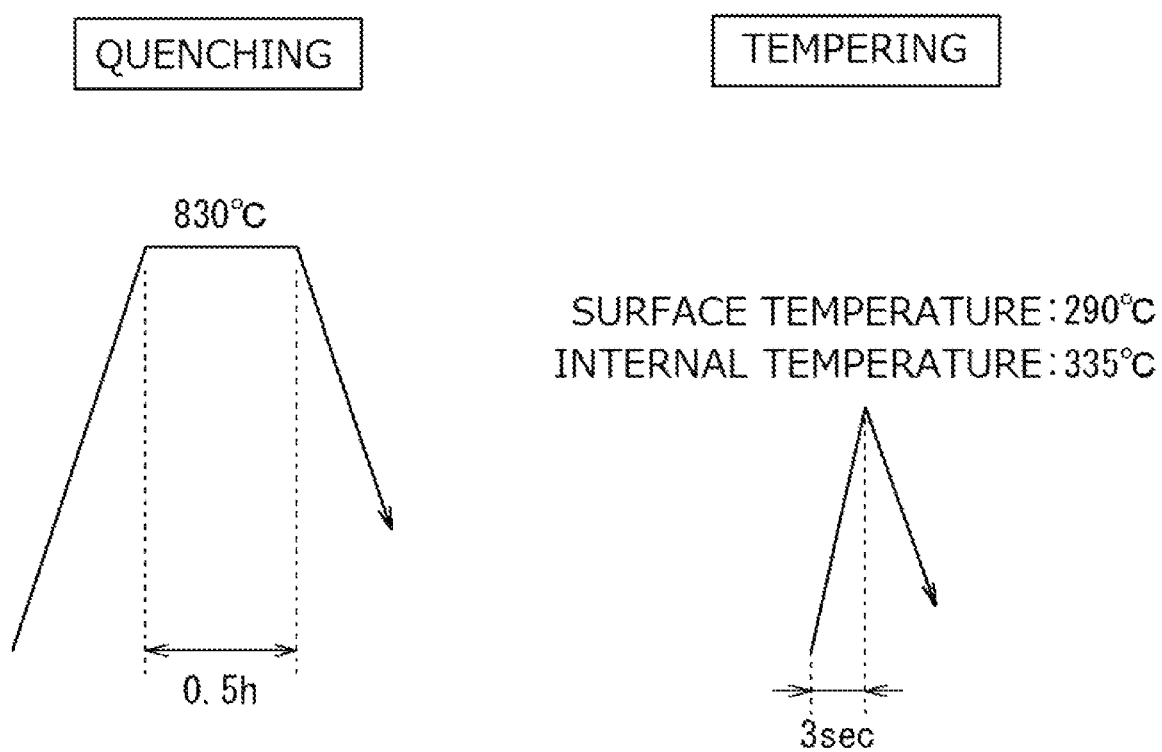
FIG. 10 is a diagram illustrating heat treatment conditions in Example 4.
Figure 11:
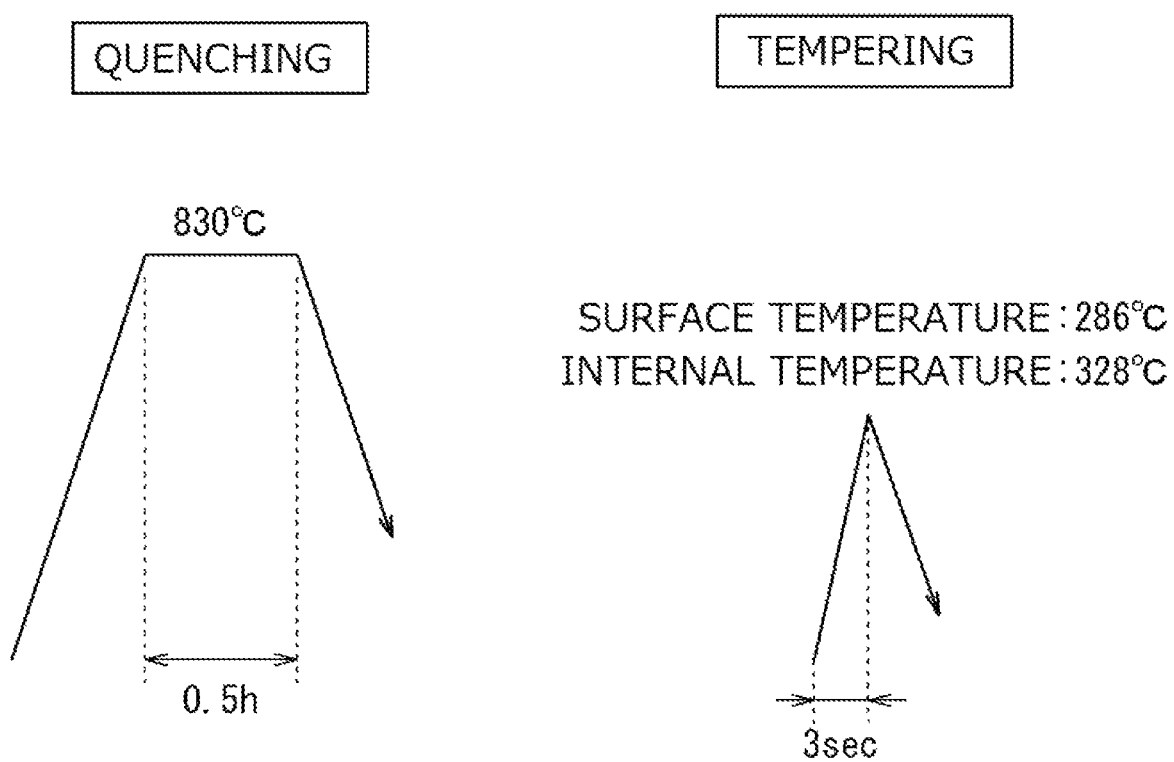
FIG. 11 is a diagram illustrating heat treatment conditions in Example 5.
Figure 12:
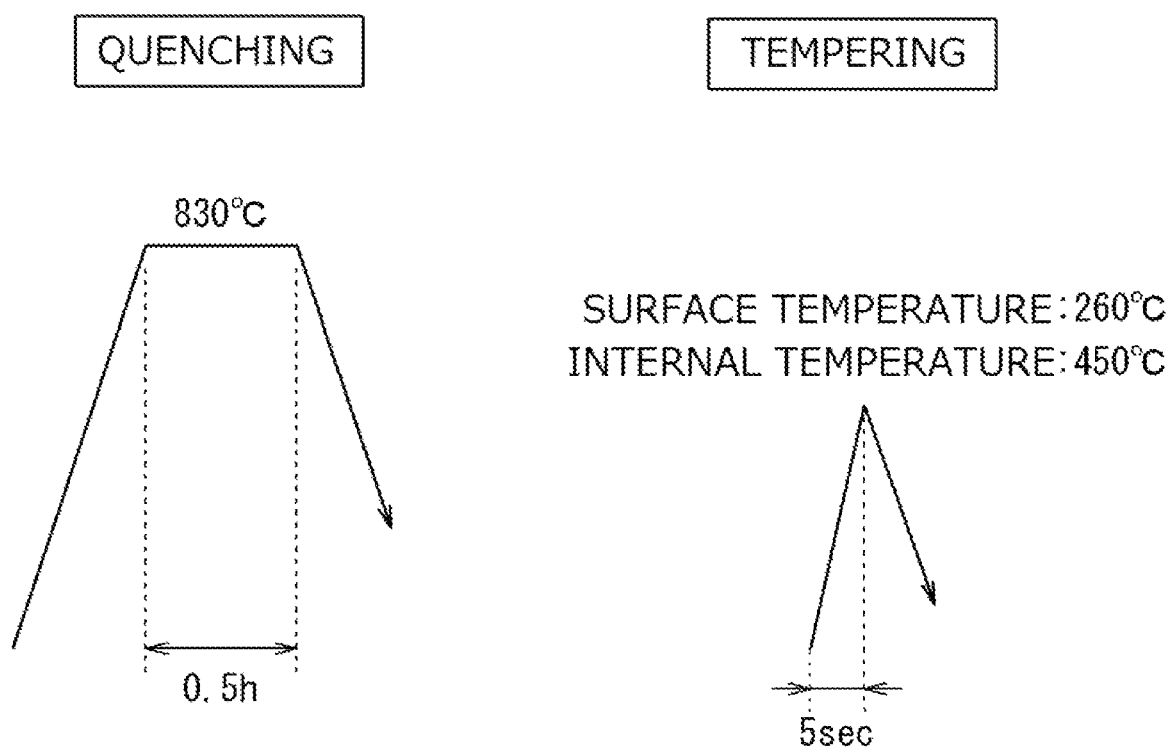
FIG. 12 is a diagram illustrating heat treatment conditions in Example 6.
Figure 13:
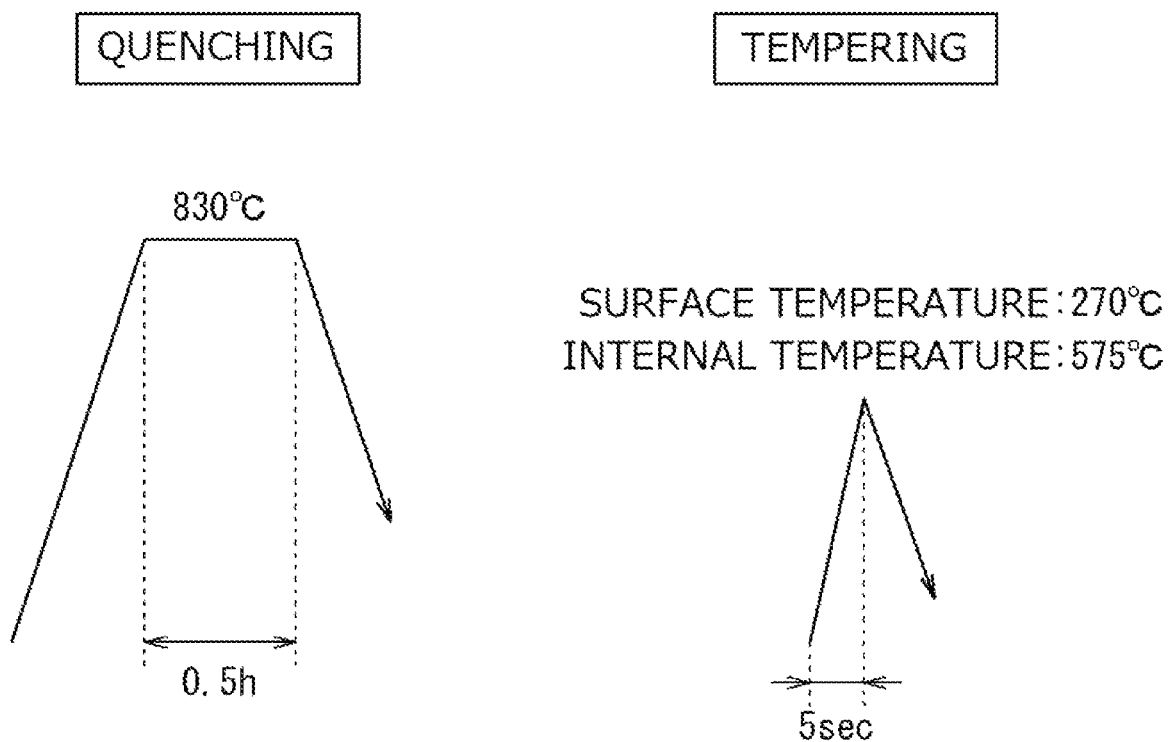
FIG. 13 is a diagram illustrating heat treatment conditions in Example 7.
Figure 14:
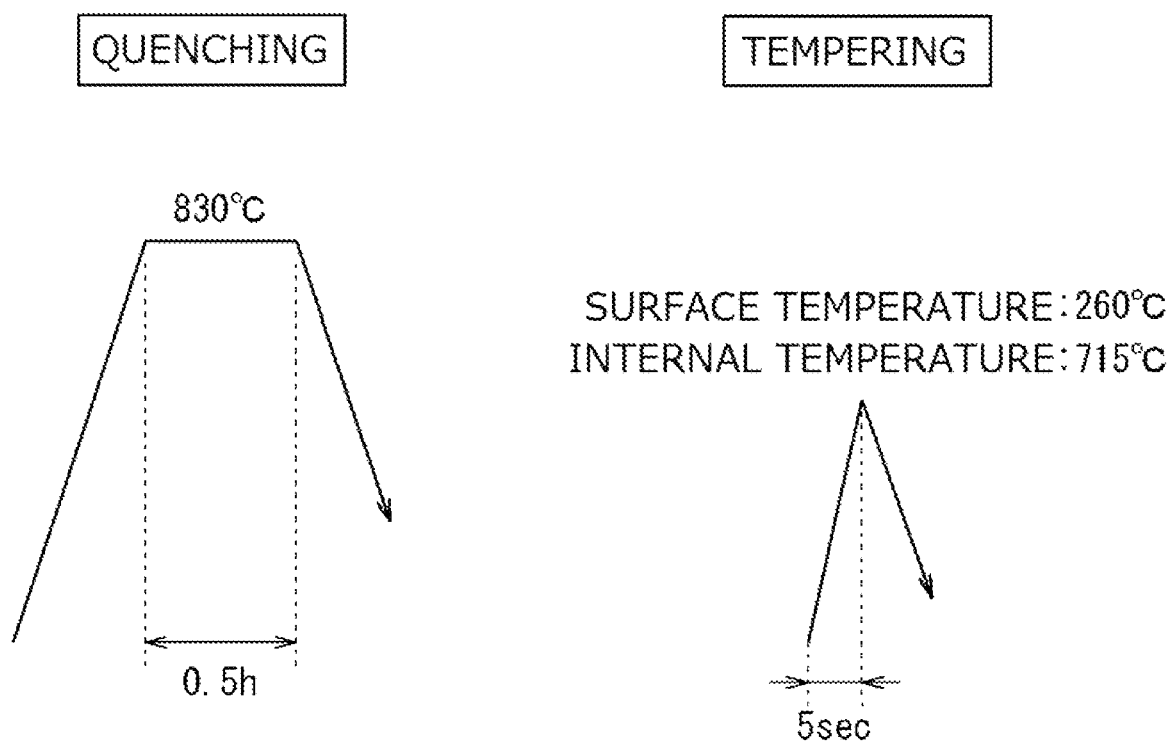
FIG. 14 is a diagram illustrating heat treatment conditions in Example 8.
Figure 15:
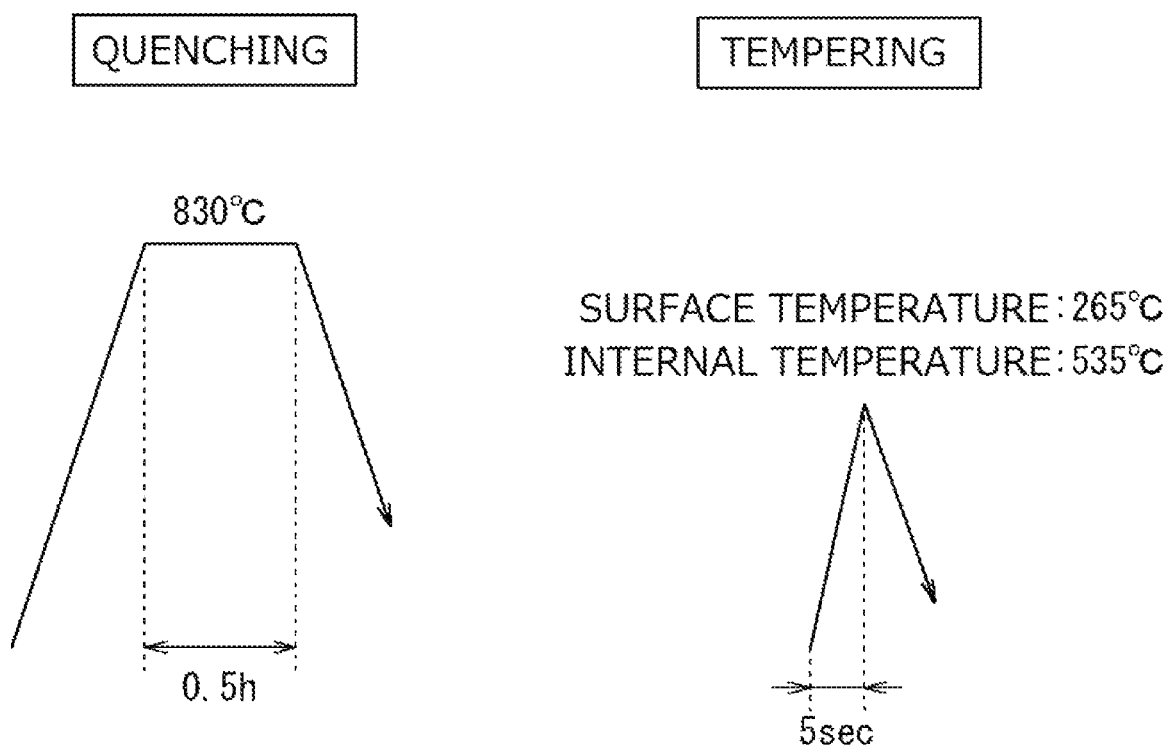
FIG. 15 is a diagram illustrating heat treatment conditions in Example 9.

Examples 2 to 9 will be described below. Outer ring specimens were obtained as is the case with Example 1 except that the tempering conditions were changed to conditions in Table 1 and FIGS. 8 to 15. FIG. 8 is a diagram indicating heat treatment conditions in Example 2. In Example 2, quenching was performed as is the case with Example 1, and the workpiece was then set in the heat treatment apparatus 200. The workpiece was tempered by being inductively heated at a frequency of 430 Hz and an output power of 35 kW for five seconds so as to have a surface temperature of 265° C. and an internal temperature of 325° C., with the surfaces of the workpiece simultaneously cooled. FIG. 9 is a diagram indicating heat treatment conditions in Example 3. In Example 3, quenching was performed as is the case with Example 1, and the workpiece was then set in the heat treatment apparatus 200. The workpiece was tempered by being inductively heated at a frequency of 480 Hz and an output power of 54 kW for five seconds so as to have a surface temperature of 270° C. and an internal temperature of 420° C., with the surfaces of the workpiece simultaneously cooled. FIG. 10 is a diagram indicating heat treatment conditions in Example 4. In Example 4, quenching was performed as is the case with Example 1, and the workpiece was then set in the heat treatment apparatus 200. The workpiece was tempered by being inductively heated at a frequency of 380 Hz and an output power of 43 kW for three seconds so as to have a surface temperature of 290° C. and an internal temperature of 335° C., with the surfaces of the workpiece simultaneously cooled. FIG. 11 is a diagram indicating heat treatment conditions in Example 5. In Example 5, quenching was performed as is the case with Example 1, and the workpiece was then set in the heat treatment apparatus 200. The workpiece was tempered by being inductively heated at a frequency of 480 Hz and an output power of 40 kW for three seconds so as to have a surface temperature of 286° C. and an internal temperature of 328° C., with the surfaces of the workpiece simultaneously cooled. FIG. 12 is a diagram indicating heat treatment conditions in Example 6. In Example 6, quenching was performed as is the case with Example 1, and the workpiece was then set in the heat treatment apparatus 200. The workpiece was tempered by being inductively heated at a frequency of 430 Hz and an output power of 58 kW for five seconds so as to have a surface temperature of 260° C. and an internal temperature of 450° C., with the surfaces of the workpiece simultaneously cooled. FIG. 13 is a diagram indicating heat treatment conditions in Example 7. In Example 7, quenching was performed as is the case with Example 1, and the workpiece was then set in the heat treatment apparatus 200. The workpiece was tempered by being inductively heated at a frequency of 430 Hz and an output power of 72 kW for five seconds so as to have a surface temperature of 270° C. and an internal temperature of 575° C., with the surfaces of the workpiece simultaneously cooled. FIG. 14 is a diagram indicating heat treatment conditions in Example 8. In Example 8, quenching was performed as is the case with Example 1, and the workpiece was then set in the heat treatment apparatus 200. The workpiece was tempered by being inductively heated at a frequency of 380 Hz and an output power of 95 kW for five seconds so as to have a surface temperature of 260° C. and an internal temperature of 715° C., with the surfaces of the workpiece simultaneously cooled. FIG. 15 is a diagram indicating heat treatment conditions in Example 9. In Example 9, quenching was performed as is the case with Example 1, and the workpiece was then set in the heat treatment apparatus 200. The workpiece was tempered by being inductively heated at a frequency of 430 Hz and an output power of 68 kW for five seconds so as to have a surface temperature of 265° C. and an internal temperature of 535° C., with the surfaces of the workpiece simultaneously cooled.

Figure 16:
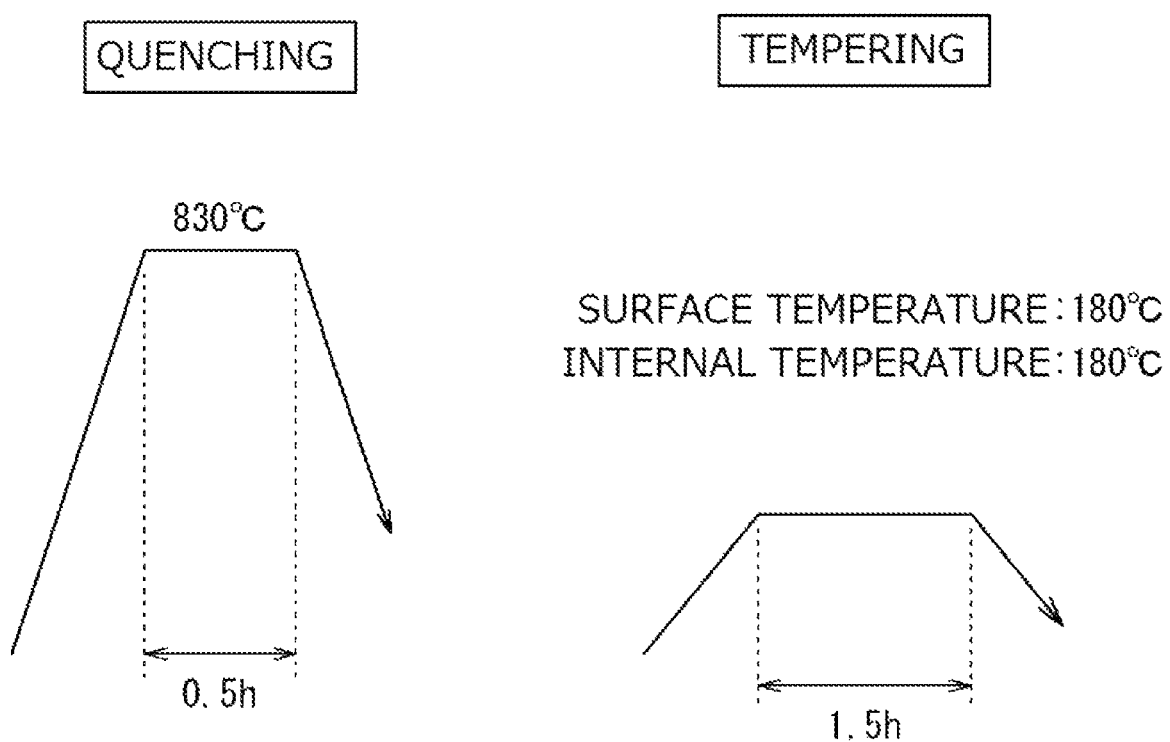
FIG. 16 is a diagram illustrating heat treatment conditions in Comparative Example 1.
Figure 18:
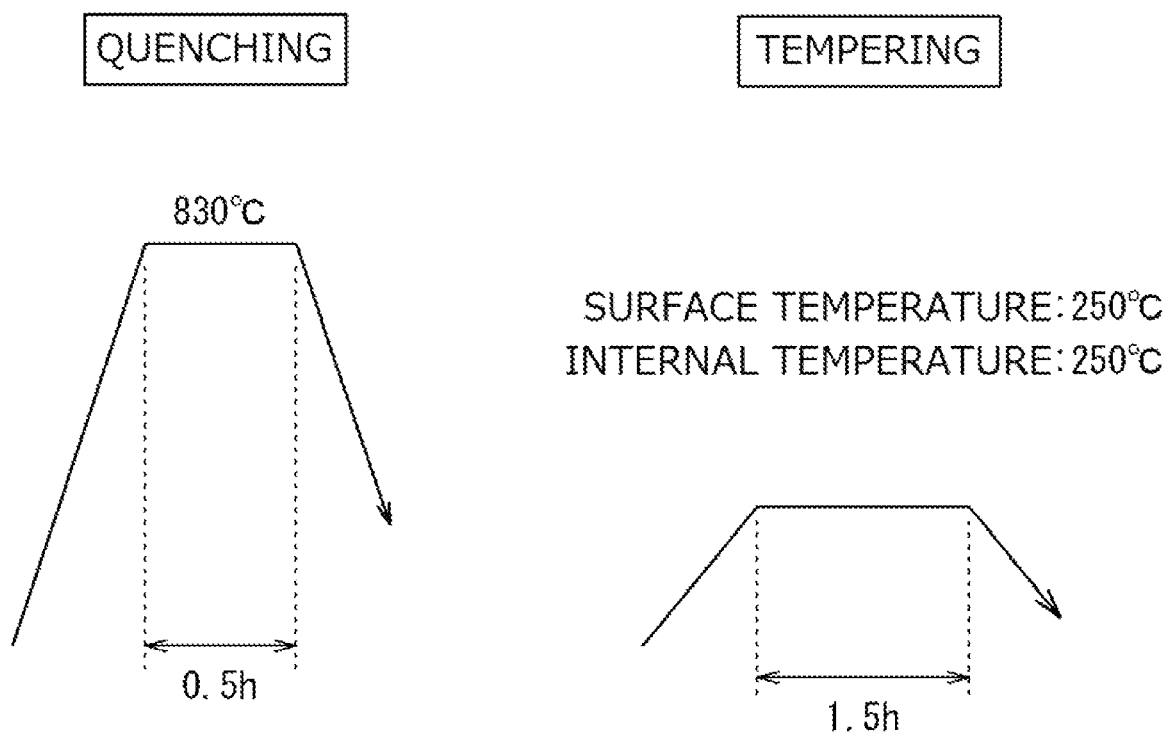
FIG. 18 is a diagram illustrating heat treatment conditions in Comparative Example 3.

Comparative Examples 1 and 3 will be described below. Outer ring specimens were obtained as is the case with Example 1 except that tempering was performed using a tempering furnace and that the tempering conditions were conditions indicated in Table 1 and FIGS. 16 and 18. FIG. 16 is a diagram indicating heat treatment conditions in Comparative Example 1. In Comparative Example 1, the workpiece was heated at 830° C. for 0.5 hours for bulk quenching and then cooled in oil down to 80° C. Then, the workpiece was heated at 180° C. (180° C. for both the surface temperature and the internal temperature) for 1.5 hours for tempering. FIG. 18 is a diagram indicating heat treatment conditions in Comparative Example 3. In Comparative Example 3, the workpiece was heated at 830° C. for 0.5 hours for bulk quenching and then cooled in oil down to 80° C. Then, the workpiece was heated at 250° C. (250° C. for both the surface temperature and the internal temperature) for 1.5 hours for tempering.

Figure 17:
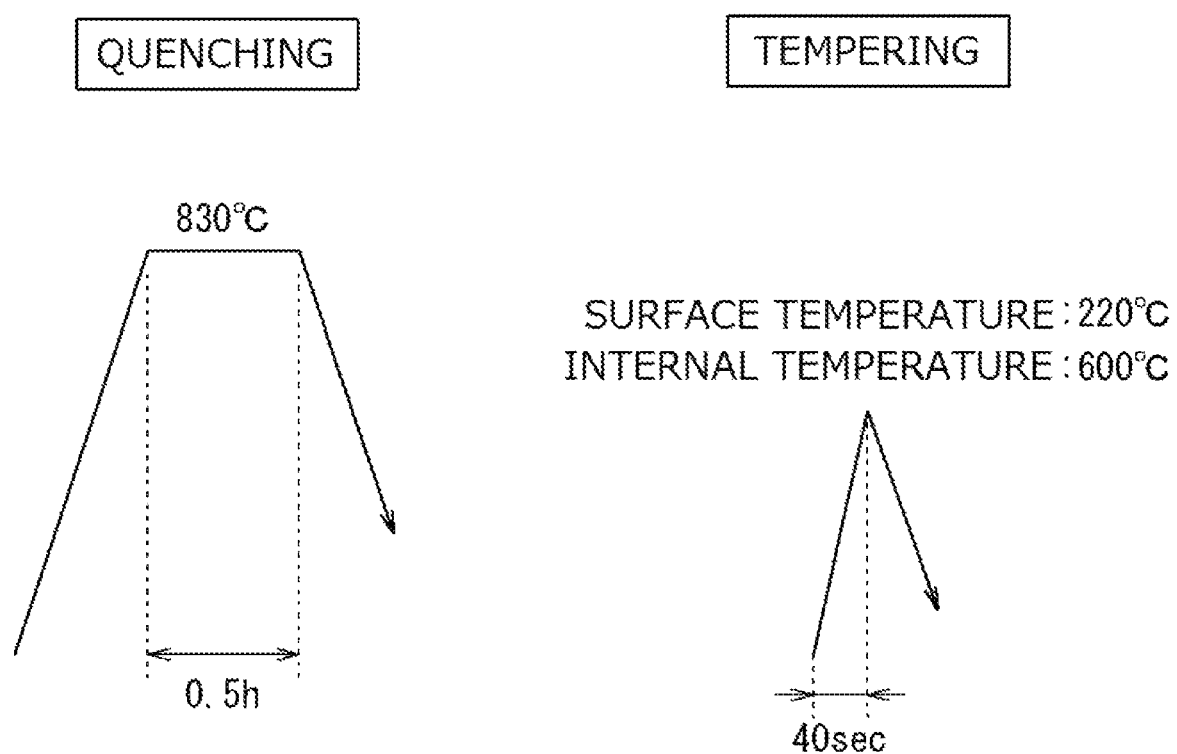
FIG. 17 is a diagram illustrating heat treatment conditions in Comparative Example 2.
Figure 19:
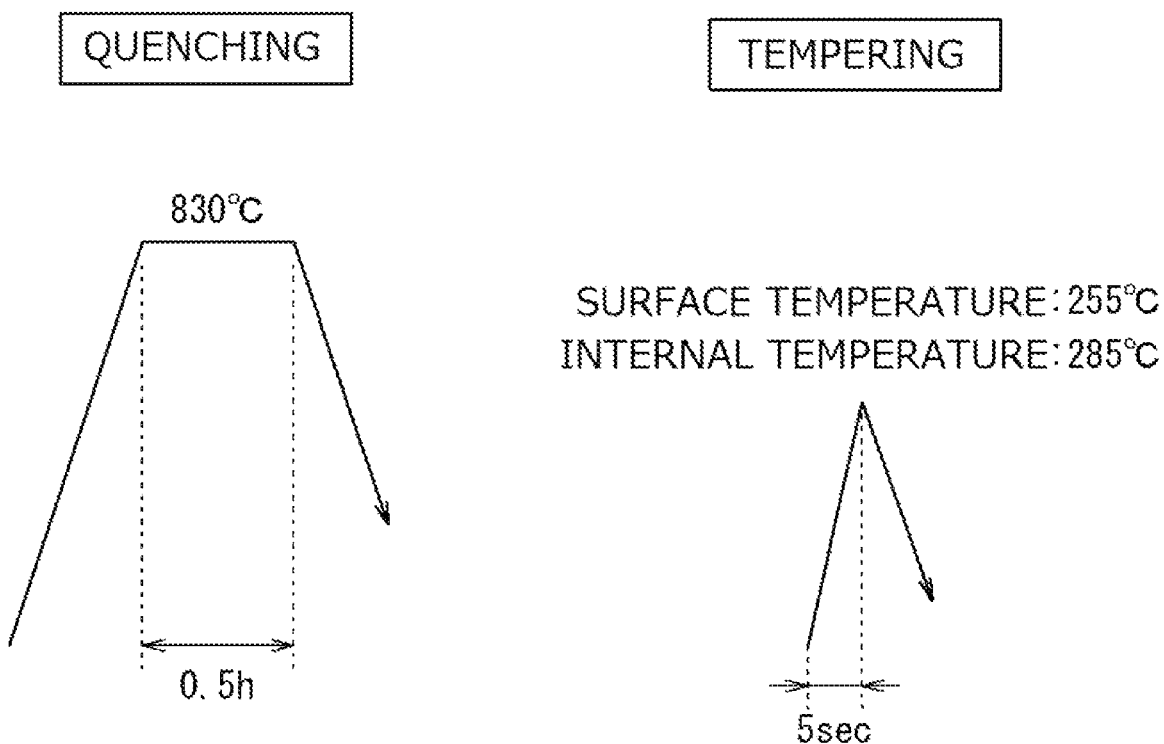
FIG. 19 is a diagram illustrating heat treatment conditions in Comparative Example 4.

Comparative Examples 2 and 4 will be described below. Outer ring specimens were obtained as is the case with Example 1 except that the tempering conditions were changed to conditions in Table 1 and FIGS. 17 and 19. FIG. 17 is a diagram indicating heat treatment conditions in Comparative Example 2. In Comparative Example 2, quenching was performed as is the case with Example 1, and the workpiece was then set in the heat treatment apparatus 200. The workpiece was tempered by being inductively heated at a frequency of 605 Hz and an output power of 83 kW for 40 seconds so as to have a surface temperature of 220° C. and an internal temperature of 600° C., with the surfaces of the workpiece simultaneously cooled. FIG. 19 is a diagram indicating heat treatment conditions in Comparative Example 4. In Comparative Example 4, quenching was performed as is the case with Example 1, and the workpiece was then set in the heat treatment apparatus 200. The workpiece was tempered by being inductively heated at a frequency of 430 Hz and an output power of 29 kW for five seconds so as to have a surface temperature of 255° C. and an internal temperature of 285° C., with the surfaces of the workpiece simultaneously cooled.

Comparative Example 5 will be described below. Outer ring specimens were obtained as is the case with Comparative Example 1 except that tempering was performed using the following method. That is, thermal refining and induction hardening were performed under conditions in Table 1 and FIG. 20 using the controlled atmosphere heat treatment furnace, a tempering furnace, and an induction hardening machine. FIG. 20 is a diagram indicating heat treatment conditions in Comparative Example 5. In Comparative Example 5, first, the workpiece was subjected to thermal refining including quenching at 830° C. for 0.5 hours and tempering at 600° C. for 1.5 hours. Then, induction hardening (200 kHz, 250 kW) was performed for 0.32 seconds so as to increase the temperature to 950° C. Then, tempering was performed under conditions similar to the conditions in Comparative Example 1. In Comparative Example 5, high hardness areas are formed in the outer ring raceway portion, the shoulder surface, and the outer peripheral surface of the outer ring.

Figure 21:
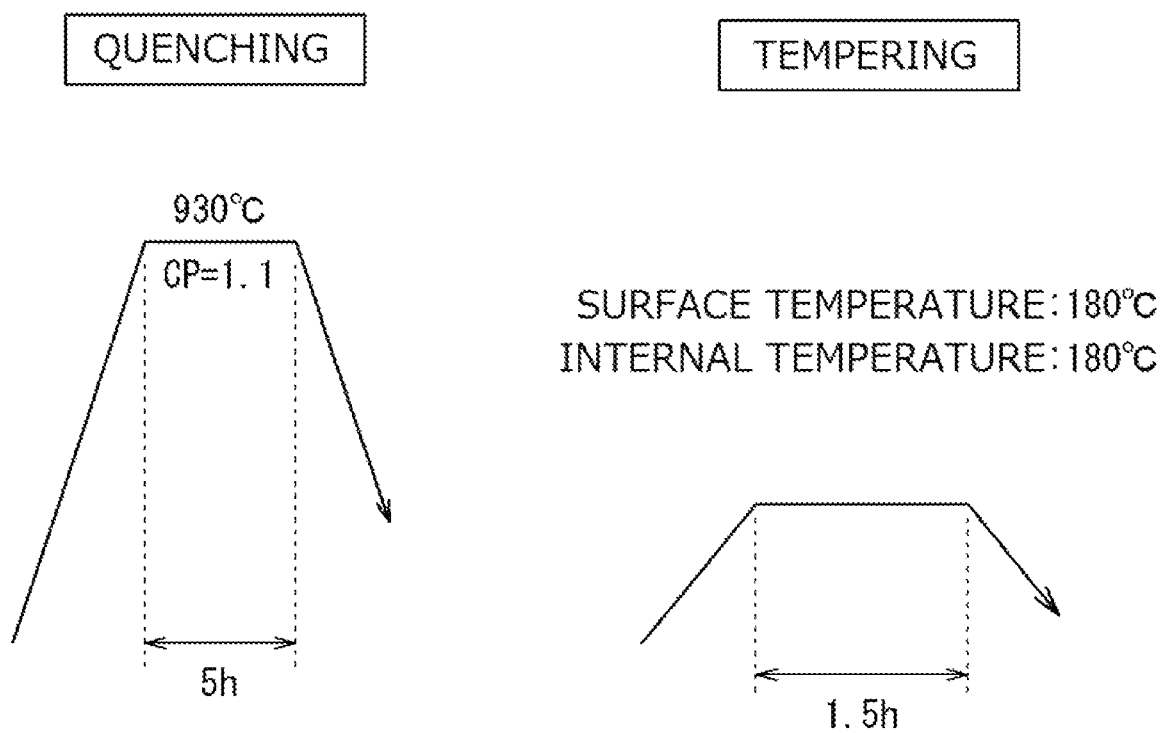
FIG. 21 is a diagram illustrating heat treatment conditions in Comparative Example 6.

Comparative Example 6 will be described below. An annular material was manufactured from a steel material formed of SAE5120, and the resultant annular material was cut into a predetermined shape. Thus, a workpiece for an outer ring was obtained (outside diameter: 62 mm, thickness: 5 mm). Then, the resultant workpiece was quenched in an atmosphere with a carbon potential of 1.1 under heat treatment conditions in Table 1 and FIG. 21. Then, tempering was performed under heat treatment conditions in Table 1 and FIG. 21, and grinding finish was executed on the workpiece to obtain a specimen for an outer ring for a bearing (bearing number 6206). For the quenching, carburizing and quenching were performed using the controlled atmosphere heat treatment furnace, and the tempering was performed as is the case with Comparative Example 1. FIG. 21 is a diagram indicating heat treatment conditions in Comparative Example 6. In Comparative Example 6, the workpiece was carburized and quenched by being heated at 930° C. for five hours and then cooled in oil down to 80° C. Then, tempering was performed under conditions similar to the conditions in Comparative Example 1.

TABLE 1

| | Steel type | Heat treatment | Quenching conditions | Tempering conditions | | | | |
|---|---|---|---|---|---|---|---|---|
| | | | | Frequency (Hz) | Output power (kW) | Treatment time (sec) | Surface temperature (° C.) | Internal temperature (° C.) |
| Example 1 | SUJ2 | Quenching and tempering | 830° C., 0.5 h | 480 | 47 | 5 | 275 | 365 |
| Example 2 | SUJ2 | Quenching and tempering | 830° C., 0.5 h | 430 | 35 | 5 | 265 | 325 |
| Example 3 | SUJ2 | Quenching and tempering | 830° C., 0.5 h | 480 | 54 | 5 | 270 | 420 |
| Example 4 | SUJ2 | Quenching and tempering | 830° C., 0.5 h | 380 | 43 | 3 | 290 | 335 |
| Example 5 | SUJ2 | Quenching and tempering | 830° C., 0.5 h | 480 | 40 | 3 | 286 | 328 |
| Example 6 | SUJ2 | Quenching and tempering | 830° C., 0.5 h | 430 | 58 | 5 | 260 | 450 |
| Example 7 | SUJ2 | Quenching and tempering | 830° C., 0.5 h | 430 | 72 | 5 | 270 | 575 |
| Example 8 | SUJ2 | Quenching and tempering | 830° C., 0.5 h | 380 | 95 | 5 | 260 | 715 |
| Example 9 | SUJ2 | Quenching and tempering | 830° C., 0.5 h | 430 | 68 | 5 | 265 | 535 |
| Comparative Example 1 | SUJ2 | Quenching and tempering | 830° C., 0.5 h | — | — | 5400 | 180 | 180 |
| Comparative Example 2 | SUJ2 | Quenching and tempering | 830° C., 0.5 h | 605 | 83 | 40 | 220 | 600 |
| Comparative Example 3 | SUJ2 | Quenching and tempering | 830° C., 0.5 h | — | — | 5400 | 250 | 250 |
| Comparative Example 4 | SUJ2 | Quenching and tempering | 830° C., 0.5 h | 430 | 29 | 5 | 255 | 285 |
| Comparative Example 5 | SUJ2 | Thermal refining + induction hardening and tempering | 200 kHz, 250 kW, 0.32 sec | — | — | 5400 | 180 | 180 |
| Comparative Example 6 | SAE5120 | Carburizing and quenching, and tempering | 930° C., 5 h | — | — | 5400 | 180 | 180 |

Evaluation of the specimens will be described below. A Vickers hardness testing machine was used to determine the distribution of hardness in a section of each of the outer ring specimens in Examples 1 to 9 and Comparative Examples 1 to 6. Based on the distribution, the depth of the high hardness surface layer (d1 to d4 in FIG. 2) was calculated. The measurement of the distribution of the hardness in the section also clarifies that, for the specimens in the examples, the Vickers hardness in the section of the surface portion decreases gradually from the outermost surface toward the inner layer portion. The following were also examined for the outer ring specimens in Examples 1 to 9 and Comparative Examples 1 to 6: the hardness of the surface portion (hardness of the outermost surface of the high hardness surface layer), the hardness of the inner layer portion, maximum shearing stress depth, compressive residual stress, rolling life, crushing strength, Charpy impact value, and manufacturing costs. Moreover, the structures of the surface and inner layer portions of the outer ring specimens in Examples 1 to 9 and Comparative Examples 1 to 6 were observed using an optical microscope.

The hardness of the surface portion was measured by pressing a Vickers indenter to the surface of each outer ring specimen. The hardness of the inner layer portion was measured by pressing the Vickers indenter to a position in the section of the outer ring specimen that was located 1.5 mm away from the bottom portion of the raceway portion in a depth direction. The maximum shearing stress depth was calculated based on the Hertzian contact theory. The compressive residual stress was measured by X ray diffraction using a residual stress measuring apparatus. The rolling life was measured by conducting a radial rolling fatigue life test. A method for measuring the crushing strength will be described below. First, an Amsler testing machine was used to hold, in a radial direction, a first position and a second position of the outer ring specimen, the second position shifted by 180° from the first position in the circumferential direction. Then, the specimen was deformed by moving the first position and the second position at a speed of 0.5 mm/min along a direction connecting the first position and the second position that was perpendicular to the axis of the specimen such that the first position and the second position approach each other. The outer ring specimen was thus destroyed, and a radial load imposed at the time of the destruction was evaluated. The Charpy impact value was measured in accordance with JIS K7111-1. The results are shown in Table 2. The rolling life, the crushing strength, and the Charpy impact value were calculated as values relative to the measured values in Comparative Example 1. In the table, circles in a cost column indicate that the value is equal to or less than 0.8 times as large as the evaluative value for the outer ring in Comparative Example 1.

TABLE 2

| | Hardness of surface portion (HV) | | | | Hardness of inner layer portion (HV) | Main structure of surface portion | Main structure of inner layer portion |
|---|---|---|---|---|---|---|---|
| | d1 | d2 | d3 | d4 | | | |
| Example 1 | 740 | 742 | 760 | 750 | 642 | Martensite | Martensite |
| Example 2 | 753 | 743 | 755 | 750 | 681 | Martensite | Martensite |
| Example 3 | 743 | 743 | 750 | 748 | 620 | Martensite | Martensite |
| Example 4 | 743 | 750 | 748 | 762 | 692 | Martensite | Martensite |
| Example 5 | 748 | 760 | 720 | 740 | 710 | Martensite | Martensite |
| Example 6 | 757 | 729 | 743 | 736 | 587 | Martensite | Martensite |
| Example 7 | 742 | 750 | 745 | 755 | 531 | Martensite | Martensite |

TABLE 2-continued

| | | | | | | | |
|---|---|---|---|---|---|---|---|
| Example 8 | 753 | 766 | 748 | 756 | 491 | Martensite | Sorbite |
| Example 9 | 751 | 745 | 740 | 742 | 546 | Martensite | Martensite |
| Comparative Example 1 | 745 | 743 | 737 | 740 | 740 | Martensite | Martensite |
| Comparative Example 2 | 749 | 750 | 720 | 725 | 490 | Martensite | Sorbite |
| Comparative Example 3 | 655 | 650 | 645 | 648 | 657 | Martensite | Martensite |
| Comparative Example 4 | 758 | 760 | 745 | 740 | 721 | Martensite | Martensite |
| Comparative Example 5 | 740 | 735 | 250 | 250 | 250 | Martensite | Ferrite + cementite |
| Comparative Example 5 | 752 | 750 | 744 | 755 | 354 | Martensite | Martensite |

| | Depth of high hardness surface layer | | | | Compressive residual stress (MPa) | Rolling life (relative value) | Crushing strength (relative value) | Charpy impact value (relative value) | Cost |
|---|---|---|---|---|---|---|---|---|---|
| | d1 | d2/t | d3/t | d4/t | | | | | |
| Example 1 | 5Z0 | 0.12 | 0.14 | 0.14 | 100 | 1.4 | 1.3 | 1.4 | ○ |
| Example 2 | 6.3Z0 | 0.13 | 0.15 | 0.15 | 70 | 1.1 | 1.4 | 1.2 | ○ |
| Example 3 | 5Z0 | 0.11 | 0.13 | 0.13 | 100 | 1.8 | 1.2 | 1.5 | ○ |
| Example 4 | 7.5Z0 | 0.24 | 0.25 | 0.25 | 70 | 1.1 | 1.2 | 1.2 | ○ |
| Example 5 | 6.3Z0 | 0.33 | 0.33 | 0.33 | 50 | 1.0 | 1.1 | 1.2 | ○ |
| Example 6 | 6.3Z0 | 0.30 | 0.33 | 0.31 | 50 | 1.0 | 1.2 | 1.7 | ○ |
| Example 7 | 6.2Z0 | 0.34 | 0.33 | 0.35 | 50 | 1.0 | 1.2 | 1.8 | ○ |
| Example 8 | 4.5Z0 | 0.45 | 0.40 | 0.43 | 200 | 2.5 | 1.1 | 2.0 | ○ |
| Example 9 | 6.3Z0 | 0.33 | 0.33 | 0.33 | 150 | 2.1 | 1.2 | 1.7 | ○ |
| Comparative Example 1 | 8Z0≤ | 0.45< | 0.45< | 0.45< | 0 | 1.0 | 1.0 | 1.0 | — |
| Comparative Example 2 | 3.1Z0 | 0.19 | 0.16 | 0.16 | 0 | 1.0 | 0.6 | 2.0 | x |
| Comparative Example 3 | 0 | 0 | 0 | 0 | 0 | 0.5 | 0.5 | 2.1 | — |
| Comparative Example 4 | 6.3Z0 | 0.45< | 0.45< | 0.45< | 50 | 1.0 | 1.0 | 1.0 | ○ |
| Comparative Example 5 | 4.4Z0 | 0.25 | 0 | 0 | 200 | 1.1 | 0.6 | 1.2 | x |
| Comparative Example 5 | 5.6Z0 | 0.30 | 0.30 | 0.30 | 200 | 1.0 | 0.8 | 1.4 | x |

The results in Table 2 indicate that the specimens (Examples 1 to 9) obtained by tempering the workpiece with a tempering time of 20 seconds or shorter while cooling the workpiece such that the surface temperature of the workpiece was at least 40° C. lower than the internal temperature of the workpiece are superior to the specimen (Comparative Example 1) produced by the conventional technique in all of the crushing strength, the Charpy impact value, the compressive residual stress, and the manufacturing costs and have rolling lives equivalent to or longer than the rolling life of the specimen (Comparative Example 1). This clarifies that the use of the heat treatment apparatus and the heat treatment method according to the present invention allows an annular member with a high impact resistance and a high crushing strength to be provided with reduced manhours and reduced energy consumption.

The present invention enables an annular member with a high impact resistance and a high crushing strength to be provided with reduced manhours and reduced energy consumption.

What is claimed is:

1. A heat treatment apparatus that thermally treats an annular workpiece formed of a steel material by inductively heating the workpiece, the heat treatment apparatus comprising:
    a treatment tank in which the workpiece is set and thermally treated;
    holding portions that hold the workpiece at a predetermined position;
    an induction heating coil that surrounds the workpiece to inductively heat the workpiece; and
    a cooling medium that cools surfaces of the workpiece during the induction heating of the workpiece,
    wherein:
    the holding portion is formed of electrically insulating ceramics or an electrically insulating synthetic resin,
    the holding portions consist of first support portions, second support portions and third support portions,
    the first support portions receive a lower surface of the workpiece,
    the second support portions suppress horizontal movement of the workpiece, the second support portions receiving an outer peripheral surface of the workpiece, and
    the third support portions suppress upward movement of the workpiece.

2. The heat treatment apparatus according to claim 1, wherein the cooling medium is stored in the treatment tank.

3. The heat treatment apparatus according to claim 1, further comprising a power transmission portion that transmits power allowing the workpiece to rotate around an axis of the workpiece, to the holding portion.

4. The heat treatment apparatus according to claim 2, further comprising a power transmission portion that transmits power allowing the workpiece to rotate around an axis of the workpiece, to the holding portion.

5. The heat treatment apparatus according to claim 2, further comprising an injection portion that injects the cooling medium into the treatment tank, wherein
the cooling medium stored in the treatment tank is stirred by the cooling medium injected through the injection portion.

6. The heat treatment apparatus according to claim 3, further comprising an injection portion that injects the cooling medium into the treatment tank, wherein
the cooling medium stored in the treatment tank is stirred by the cooling medium injected through the injection portion.

7. The heat treatment apparatus according to claim 5, wherein the treatment tank has a cylindrical outer case and a cylindrical inner case disposed inside the outer case, and
the cooling medium is injected between an inner peripheral surface of the outer case and an outer peripheral surface of the inner case through the injection portion.

* * * * *